United States Patent
Yu et al.

(10) Patent No.: US 11,332,404 B2
(45) Date of Patent: *May 17, 2022

(54) MICROCRYSTALLINE GLASS, MICROCRYSTALLINE GLASS PRODUCT, AND MANUFACTURING METHOD THEREFOR

(71) Applicant: CDGM GLASS CO., LTD, Sichuan (CN)

(72) Inventors: Tianlai Yu, Sichuan (CN); Baoping Yuan, Sichuan (CN); Zhenyu Liu, Sichuan (CN)

(73) Assignee: CDGM GLASS CO., LTD, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,317

(22) Filed: Sep. 30, 2020

(65) Prior Publication Data

US 2021/0024405 A1 Jan. 28, 2021

Related U.S. Application Data

(63) Continuation of application No. PCT/CN2019/112544, filed on Oct. 22, 2019.

(30) Foreign Application Priority Data

Oct. 26, 2018 (CN) .......................... 201811264839.0

(51) Int. Cl.
*C03C 10/04* (2006.01)
*C03C 10/14* (2006.01)
*C03C 10/00* (2006.01)

(52) U.S. Cl.
CPC ...... *C03C 10/0027* (2013.01); *C03C 10/0009* (2013.01); *C03C 10/0054* (2013.01)

(58) Field of Classification Search
CPC .................. C03C 10/0009; C03C 10/0027
See application file for complete search history.

(56) References Cited

U.S. PATENT DOCUMENTS

| | | | | |
|---|---|---|---|---|
| 6,677,259 | B2 * | 1/2004 | Goto | ................ C03C 10/0027 501/4 |
| 8,043,706 | B2 * | 10/2011 | Goto | ................... C03B 27/02 428/426 |
| 8,093,167 | B2 * | 1/2012 | Yagi | ...................... C03C 3/112 501/63 |
| 10,676,390 | B2 * | 6/2020 | Yuan | ..................... C03C 3/097 |
| 10,913,681 | B2 * | 2/2021 | Yuan | ................ C03C 10/0027 |
| 2003/0012961 | A1 | 1/2003 | Goto et al. | |
| 2009/0118113 | A1 | 5/2009 | Yagi | |
| 2016/0102010 | A1 * | 4/2016 | Beall | ..................... C03C 21/002 428/410 |
| 2018/0244564 | A1 * | 8/2018 | Ritzberger | ............. C03C 3/097 |
| 2019/0161395 | A1 * | 5/2019 | Beall | ..................... C03C 3/097 |
| 2020/0131080 | A1 * | 4/2020 | Yuan | ..................... C03C 3/085 |
| 2020/0277221 | A1 * | 9/2020 | Yuan | ..................... H05K 5/03 |

FOREIGN PATENT DOCUMENTS

| | | | |
|---|---|---|---|
| CN | 101279818 A | 10/2008 | |
| CN | 102123960 A | 7/2011 | |
| CN | 105683109 A | 6/2016 | |
| CN | 109320091 A | 2/2019 | |
| JP | S63210039 A | 8/1988 | |
| JP | 2000143290 A | * 5/2000 | ......... C03C 10/0027 |
| JP | 2001318222 A | * 11/2001 | |

* cited by examiner

*Primary Examiner* — Karle Group

(74) *Attorney, Agent, or Firm* — Hauptman Ham, LLP

(57) ABSTRACT

The present invention discloses a microcrystalline glass, a microcrystalline glass product, and a manufacturing method therefor. The main crystal phase of the microcrystalline glass comprises lithium silicate and a quartz crystal phase. The haze of the microcrystalline glass of the thickness of 0.55 mm is below 0.6%. The microcrystalline glass comprises the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%. A four-point bending strength of the microcrystalline glass product is more than 600 Mpa.

30 Claims, No Drawings

MICROCRYSTALLINE GLASS, MICROCRYSTALLINE GLASS PRODUCT, AND MANUFACTURING METHOD THEREFOR

The present application is a Continuation of International Application No. PCT/CN2019/112544, filed Oct. 22, 2019, which claims priority from Chinese Application Number 201811264839.0, filed Oct. 26, 2018.

TECHNICAL FIELD

The present invention relates to a microcrystalline glass, a microcrystalline glass product and a manufacturing method therefor, in particular to a microcrystalline glass and a microcrystalline glass product with excellent mechanical properties suitable for an electronic device or a display device and a manufacturing method therefor.

BACKGROUND

Microcrystalline glass is a material that separates out crystals in glass by heat treatment. Based on the internally dispersed crystals, microcrystalline glass can possess a physical property value that cannot be obtained in glass. Examples include mechanical strength such as Young's modulus and fracture toughness, etching properties for acidic or alkaline liquid medicines, thermal properties such as thermal expansion coefficient, and increase and disappearance of glass transition temperature. Microcrystalline glass has higher mechanical properties and, due to the formation of microcrystals in glass, has obvious advantages over general glass in terms of bending resistance and wear resistance.

Based on the above advantages, microcrystalline glass or its products after treatment are currently used in display devices or electronic devices with high requirements for falling, compression and scratch resistance. However at present, the microcrystalline glass in the market cannot not be easily chemically tempered or has mechanical properties after chemical tempering that are undesirable for the application to a cover plate. Therefore, it has been a goal of scientific and technical personnel to develop a kind of microcrystalline glass and microcrystalline glass product suitable for display devices or electronic devices with high requirements for falling, compression and scratch resistance.

SUMMARY

The technical problem to be solved by the present invention is to provide a microcrystalline glass product with excellent mechanical properties.

The technical solution of the present invention to solve the technical problem is: (1) a microcrystalline glass product, wherein the main crystal phase thereof comprises lithium silicate and a quartz crystal phase, a four-point bending strength of the microcrystalline glass product is above 600 MPa, and the microcrystalline glass product comprises the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; $Na_2O$: 0-5°.

(2) A microcrystalline glass product, comprising the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; $Na_2O$: 0-5%.

(3) A microcrystalline glass product, comprising $SiO_2$, $Al_2O_3$ and $Li_2O$ as necessary components, wherein a four-point bending strength of the microcrystalline glass product is above 600 MPa.

(4) A microcrystalline glass product, wherein the main crystal phase thereof comprises lithium silicate and a quartz crystal phase, a crystallinity is above 50%, and the microcrystalline glass product comprises the following components in percentage by weight: $SiO_2$: 65-85%; $Al_2O_3$: 1-15%; $Li_2O$: 5-15%.

(5) A microcrystalline glass product, wherein a light transmittance for a thickness of 0.55 mm at a wavelength of 550 nm is above 80%, and the microcrystalline glass product comprises the following components in percentage by weight: $SiO_2$: 65-85%; $Al_2O_3$: 1-15%; $Li_2O$: 5-15%; $ZrO_2$: 0.1-10%; $P_2O_5$: 0.1-10%.

(6) The microcrystalline glass product according to any of (3)-(5), comprising the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; $Na_2O$: 0-5%.

(7) The microcrystalline glass product according to any of (1)-(6), comprising the following components in percentage by weight: SrO: 0-5%; and/or BaO: 0-5%; and/or $TiO_2$: 0-5%; and/or $Y_2O_3$: 0-5%; and/or $B_2O_3$: 0-3%; and/or clarifiant: 0-2%.

(8) A microcrystalline glass product, comprising the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; SrO: 0-5%; BaO: 0-5%; $TiO_2$: 0-5%; $Y_2O_3$: 0-5%; $Na_2O$: 0-5%; $B_2O_3$: 0-3%; clarifiant: 0-2%.

(9) The microcrystalline glass product according to any of (1)-(8), wherein the content of each component satisfies one or more of the following 6 conditions: 1) $(SiO_2+Li_2O)/Al_2O_3$ is 6-15; 2) $(Al_2O_3+Li_2O)/P_2O_5$ is 5-20; 3) $(SiO_2+Li_2O)/P_2O_5$ is 40-80; 4) $(SiO_2+Al_2O_3+Li_2O+ZrO_2)/P_2O_5$ is 40-90; 5) $(K_2O+MgO)/ZrO_2$ is 0.6-1.2; 6) $Li_2O/(K_2O+ZrO_2)$ is 2.3-4.0.

(10) The microcrystalline glass product according to any of (1)-(9), comprising the following components in percentage by weight: $SiO_2$: 70-80%; and/or $Al_2O_3$: 4-12%; and/or $Li_2O$: 7-15%; and/or $ZrO_2$: 0.5-6%; and/or $P_2O_5$: 0.5-5%; and/or $K_2O$: 0-5%; and/or MgO: 0-5%; and/or ZnO: 0-5%; and/or SrO: 0-1%; and/or BaO: 0-1%; and/or $TiO_2$: 0-1%; and/or $Y_2O_3$: 0-1%; and/or $Na_2O$: 0-3%; and/or $B_2O_3$: 0.1-2%; and/or clarifiant: 0-1%.

(11) The microcrystalline glass product according to any of (1)-(10), wherein the content of each component satisfies one or more of the following 6 conditions: 1) $(SiO_2+Li_2O)/Al_2O_3$ is 8-13; 2) $(Al_2O_3+Li_2O)/P_2O_5$ is 6-14; 3) $(SiO_2+Li_2O)/P_2O_5$ is 40-70; 4) $(SiO_2+Al_2O_3+Li_2O+ZrO_2)/P_2O_5$ is 45-85; 5) $(K_2O+MgO)/ZrO_2$ is 0.7-1.1; 6) $Li_2O/(K_2O+ZrO_2)$ is 2.5-3.5.

(12) The microcrystalline glass product according to any of (1)-(11), comprising the following components in percentage by weight: $SiO_2$: 70-76%; and/or $Al_2O_3$: 4-10%; and/or $Li_2O$: 8-12.5%; and/or $ZrO_2$: 1-5%; and/or $P_2O$: 1-2%; and/or $K_2O$: 0-3%; and/or MgO: 0.3-2%; and/or ZnO: 0-3%; and/or $Na_2O$: 0-1%; and/or $Sb_2O_3$: 0-1%; and/or $SnO_2$: 0-1%; and/or SnO: 0-1%.

(13) The microcrystalline glass product according to any of (1)-(12), wherein the content of each component satisfies one or more of the following 6 conditions: 1) $(Si_2+Li_2O)/Al_2O_3$ is 8-12.5; 2) $(Al_2O_3+Li_2O)/P_2O_5$ is 8-14; 3) $(SiO_2+$ $Li_2O)/P_2O_5$ is 42-60; 4) $(Si_2+Al_2O_3+Li_2O+ZrO_2)/P_2O_5$ is 46-80; 5) $(K_2O+MgO)/ZrO_2$ is 0.8-1.0; 6) $Li_2O/(K_2O+ZrO_2)$ is 2.8-3.3.

(14) The microcrystalline glass product according to any of (1)-(13), comprising the following components in percentage by weight: $Li_2O$: 8% to less than 10%; and/or not comprising SrO; and/or not comprising BaO; and/or not comprising $TiO_2$; and/or not comprising $Y_2O_3$; and/or not comprising $GeO_2$; and/or not comprising CaO; and/or not comprising $Cs_2O$; and/or not comprising PbO; and/or not comprising $B_2O_3$; and/or not comprising $As_2O_3$; and/or not comprising $La_2O_3$; and/or not comprising $Tb_2O_3$.

(15) The microcrystalline glass product according to any of (1)-(14), wherein the content of each component satisfies one or more of the following 4 conditions: 1) $(Al_2O_3+Li_2O)/P_2O_5$ is 8.5-14; 2) $(SiO_2+Li_2O)/P_2O_5$ is 45-60; 3)$(SiO_2+Al_2O_3+Li_2O+ZrO_2)/P_2O_5$ is 48-80; 4) $(SiO_2+Li_2O)/Al_2O_3$ is 8.5-12.

(16) The microcrystalline glass product according to any of (1)-(15), wherein the main crystal phase thereof comprises lithium disilicate and a quartz crystal phase and/or petalite.

(17) The microcrystalline glass product according to any of (1)-(16), wherein a crystallinity thereof is above 50%, preferably above 65%, more preferably above 70%, further preferably above 75%.

(18) The microcrystalline glass product according to any of (1)-(17), wherein a surface stress is above 200 MPa, preferably above 250 MPa, more preferably above 300 MPa.

(19) The microcrystalline glass product according to any of (1)-(18), wherein a depth of an ion exchange layer is above 30 μm, preferably above 50 μm, more preferably above 60 μm, further preferably above 80 μm.

(20) The microcrystalline glass product according to any of (1)-(19), wherein a falling ball test height is above 700 mm, preferably above 800 mm, more preferably above 1,000 mm, further preferably above 1,200 mm.

(21) The microcrystalline glass product according to any of (1)-(20), wherein a fracture toughness is above 1 $MPa·m^{1/2}$, preferably above 1.3 $MPa·m^{1/2}$, more preferably above 1.5 $MPa·m^{1/2}$.

(22) The microcrystalline glass product according to any of (1)-(21), wherein a four-point bending strength is above 600 MPa, preferably above 650 MPa, more preferably above 700 MPa.

(23) The microcrystalline glass product according to any of (1)-(22), wherein the haze for a thickness of 0.55 mm is below 0.6%, preferably below 0.5%, more preferably below 0.4%.

(24) The microcrystalline glass product according to any of (1)-(23), wherein a grain size is below 100 nm, preferably below 80 nm, more preferably below 60 nm, further preferably below 50 nm, still further preferably below 40 nm.

(25) The microcrystalline glass product according to any of (1)-(24), wherein a thermal refractive index coefficient is below $-0.5·10^{-6}/°C$, preferably below $-0.8\times10^{-6}/°C$, more preferably below $-1.1\times10^{-6}/°C$.

(26) The microcrystalline glass product according to any of (1)-(25), wherein an average light transmittance for a thickness of 1 mm at a wavelength of 400-800 nm is above 80%, preferably above 85%, more preferably above 88%.

(27) The microcrystalline glass product according to any of (1)-(26), wherein a light transmittance for a thickness of 0.55 mm at a wavelength of 550 nm is above 80%, preferably above 85%, more preferably above 88%, further preferably above 91.

(28) The microcrystalline glass product according to any of (1)-(27), further comprising a colorant capable of making the microcrystalline glass product show up in different colors.

(29) The microcrystalline glass product according to (28), wherein the colorant thereof comprises the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(30) The microcrystalline glass product according to any of (28) or (29), wherein the colorant thereof comprises the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.1-4%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(31) The microcrystalline glass product according to any of (28) or (29), wherein the colorant thereof comprises the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(32) The microcrystalline glass product according to any of (28) or (29), wherein the colorant thereof comprises the following components in percentage by weight: NiO: 0.1-3%; and/or $Ni_2O_3$: 0.1-3%.

(33) The microcrystalline glass product according to any of (28) or (29), wherein the colorant thereof comprises the following components in percentage by weight: CoO: 0.05-1.8%; and/or $Co_2O_3$: 0.05-1.8%.

(34) The microcrystalline glass product according to any of (28) or (29), wherein the colorant thereof comprises the following components in percentage by weight: $Cu_2O$: 0.5-3%; and/or $CeO_2$: 0.5-3%.

(35) The microcrystalline glass product according to any of (28) or (29), wherein the colorant thereof comprises the following components in percentage by weight: $Fe_2O_3$: 0.2-5%, CoO: 0.05-0.3%; or $Fe_2O_3$: 0.2-5%, $Co_2O_3$: 0.05-0.3%; or $Fe_2O_3$: 0.2-5%, CoO: 0.05-0.3% and NiO: 0.1-1%; or $Fe_2O_3$: 0.2-5%, $Co_2O_3$: 0.05-0.3%, and NiO: 0.1-1%.

(36) The microcrystalline glass product according to any of (28) or (29), wherein the colorant thereof comprises the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(37) The microcrystalline glass product according to any of (28) or (29), wherein the colorant thereof comprises the following components in percentage by weight: $Er_2O_3$: 0.4-6%, $Nd_2O_3$: 0.4-4%, and $MnO_2$: 0.1-2%.

The present invention further provides a microcrystalline glass with an excellent mechanical property.

The technical solution of the present invention to solve the technical problem is: (38) a microcrystalline glass, wherein the main crystal phase thereof comprises lithium silicate and a quartz crystal phase. A haze of the microcrystalline glass with a thickness of 0.55 mm is below 0.6%. The microcrystalline glass comprises the following components in percentage by weight: $SiO_2$: 65-85%: $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%.

(39) A microcrystalline glass, comprising the following components in percentage by weight: $SiO_2$: 65-85%; $Al_2O_3$:

1-15%; Li$_2$O: 5-15%; ZrO$_2$: 0.1-10%; P$_2$O$_5$: 0.1-10%; K$_2$O: 0-10%; MgO: 0-10%; ZnO: 0-10%.

(40) A microcrystalline glass, comprising SiO$_2$, Al$_2$O$_3$ and Li$_2$O as necessary components, wherein the haze of the microcrystalline glass with a thickness of 0.55 mm is below 0.6%.

(41) A microcrystalline glass, wherein the main crystal phase thereof comprises lithium silicate and a quartz crystal phase, and the crystallinity is above 50%; the microcrystalline glass comprises the following components in percentage by weight: SiO$_2$: 65-85%; Al$_2$O$_3$: 1-15%; Li$_2$O: 5-15%.

(42) A microcrystalline glass, wherein a light transmittance for a thickness of 0.55 mm at a wavelength of 550 nm is above 80%; the microcrystalline glass comprises the following components in percentage by weight: SiO$_2$: 65-85%; Al$_2$O$_3$: 1-15%; Li$_2$O: 5-15%; ZrO$_2$: 0.1-10%; P$_2$O$_5$: 0.1-10%.

(43) The microcrystalline glass according to any of (40)-(42), comprising the following components in percentage by weight: SiO$_2$: 65-85%; Al$_2$O$_3$: 1-15%; Li$_2$O: 5-15%; ZrO$_2$: 0.1-10%; P$_2$O$_5$: 0.1-10%; K$_2$O: 0-10%; MgO: 0-10%; ZnO: 0-10%.

(44) The microcrystalline glass according to any of (38)-(43), further comprising the following components in percentage by weight: SrO: 0-5%; and/or BaO: 0-5%; and/or TiO$_2$: 0-5%; and/or Y$_2$O$_3$: 0-5%; and/or Na$_2$O: 0-3%; and/or B$_2$O$_3$: 0-3%; and/or clarifiant: 0-2%.

(45) The microcrystalline glass according to any of (38)-(44), wherein the content of each component satisfies one or more of the following 6 conditions: 1) (SiO$_2$+Li$_2$O)/Al$_2$O$_3$ is 6-15; 2) (Al$_2$O$_3$+Li$_2$O)/P$_2$O$_5$ is 5-20; 3) (SiO$_2$+Li$_2$O)/P$_2$O$_5$ is 40-80; 4) (Si$_2$+Al$_2$O$_3$+Li$_2$O+ZrO$_2$)/P$_2$O$_5$ is 40-90; 5) (K$_2$O+MgO)/ZrO$_2$ is 0.6-1.2; 6) Li$_2$O/(K$_2$O+ZrO$_2$) is 2.3-4.0.

(46) The microcrystalline glass according to any of (38)-(45), comprising the following components in percentage by weight: SiO$_2$: 70-80%; and/or Al$_2$O$_3$: 4-12%; and/or Li$_2$O: 7-15%; and/or ZrO$_2$: 0.5-6%; and/or P$_2$O$_5$: 0.5-5%; and/or K$_2$O: 0-5%; and/or MgO: 0-5%; and/or ZnO: 0-5%; and/or SrO: 0-1%; and/or BaO: 0-1%, and/or TiO$_2$: 0-1%; and/or Y$_2$O$_3$: 0-1%; and/or Na$_2$O: 0-1%; and/or B$_2$O$_3$: 0.1-2%; and/or clarifiant: 0-1%.

(47) The microcrystalline glass according to any of (38)-(46), wherein the content of each component satisfies one or more of the following 6 conditions: 1) (SiO$_2$+Li$_2$O)/Al$_2$O$_3$ is 8-13; 2) (Al$_2$O$_3$+Li$_2$O)/P$_2$O$_5$ is 6-14; 3) (SiO$_2$+Li$_2$O)/P$_2$O$_5$ is 40-70; 4) (SiO$_2$+Al$_2$O$_3$+Li$_2$O+ZrO$_2$)/P$_2$O$_5$ is 45-85; 5) (K$_2$O+MgO)/ZrO$_2$ is 0.7-1.1; 6) Li$_2$O/(K$_2$O+ZrO$_2$) is 2.5-3.5.

(48) The microcrystalline glass according to any of (38)-(47), comprising the following components in percentage by weight: SiO$_2$: 70-76%; and/or Al$_2$O$_3$: 4-10%; and/or Li$_2$O: 8-12.5%; and/or ZrO$_2$: 1-5%; and/or P$_2$O$_5$: 1-2%; and/or K$_2$O: 0-3%; and/or MgO: 0.3-2%; and/or ZnO: 0-3%; and/or Sb$_2$O$_3$: 0-1%; and/or SnO$_2$: 0-1%; and/or SnO: 0-1%.

(49) The microcrystalline glass according to any of (38)-(48), wherein the content of each component satisfies one or more of the following 6 conditions: 1) (Si$_2$+Li$_2$O)/Al$_2$O$_3$ is 8-12.5; 2) (Al$_2$O$_3$+Li$_2$O)/P$_2$O$_5$ is 8-14; 3) (SiO$_2$+Li$_2$O)/P$_2$O$_5$ is 42-60; 4) (Si$_2$+Al$_2$O$_3$+Li$_2$O+ZrO$_2$)/P$_2$O$_5$ is 46-80; 5) (K$_2$O+MgO)/ZrO$_2$ is 0.8-1.0; 6) Li$_2$O/(K$_2$O+ZrO$_2$) is 2.8-3.3.

(50) The microcrystalline glass according to any of (38)-(49), comprising the following components in percentage by weight: Li$_2$O: 9% to less than 10%; not comprising SrO; and/or not comprising BaO; and/or not comprising TiO$_2$; and/or not comprising Y$_2$O$_3$; and/or not comprising GeO$_2$; and/or not comprising CaO; and/or not comprising Cs$_2$O; and/or not comprising PbO; and/or not comprising As$_2$O$_3$; and/or not comprising La$_2$O$_3$; and/or not comprising Tb$_2$O$_3$; and/or not comprising Na$_2$O; and/or not comprising B$_2$O$_3$.

(51) The microcrystalline glass according to any of (38)-(50), wherein the content of each component satisfies one or more of the following 4 conditions: 1) (Al$_2$O$_3$+Li$_2$O)/P$_2$O$_5$ is 8.5-14; 2) (SiO$_2$+Li$_2$O)/P$_2$O$_5$ is 45-60; 3) (SiO$_2$+Al$_2$O$_3$+Li$_2$O+ZrO$_2$)/P$_2$O$_5$ is 48-80; and 4) (SiO$_2$+Li$_2$O)/Al$_2$O$_3$ is 8.5-12.

(52) The microcrystalline glass according to any of (38)-(51), wherein the main crystal phase thereof comprises lithium disilicate and a quartz crystal phase and/or petalite.

(53) The microcrystalline glass according to any of (38)-(52), wherein a crystallinity thereof is above 50%, preferably above 65%, more preferably above 70%, further preferably above 75%.

(54) The microcrystalline glass according to any of (38)-(53), where in the haze for a thickness of 0.55 mm is below 0.6%, preferably below 0.5%, more preferably below 0.4%.

(55) The microcrystalline glass according to any of (38)-(54), wherein a grain size is below 100 nm, preferably below 80 nm, more preferably below 60 nm, further preferably below 50 nm, still further preferably below 40 nm.

(56) The microcrystalline glass according to any of (38)-(55), wherein a thermal refractive index coefficient is below $-0.5 \times 10^{-6}/°$ C., preferably below $-0.8 \times 10^{-6}/°$ C., more preferably below $-1.1 \times 10^{-6}/°$ C.

(57) The microcrystalline glass according to any of (38)-(56), wherein an average light transmittance for a thickness of 1 mm at a wavelength of 400-800 nm is above 80%, preferably above 85%, more preferably above 88%.

(58) The microcrystalline glass according to any of (38)-(57), wherein a light transmittance for a thickness of 0.55 mm at a wavelength of 550 nm is above 80%, preferably above 85%, more preferably above 88%, further preferably above 91%.

(59) The microcrystalline glass according to any of (38)-(58), wherein a refractive index (nd) is 1.520-1.550, preferably 1.530-1.545.

(60) The microcrystalline glass according to any of (38)-(59), further comprising a colorant capable of making the microcrystalline glass show up in different colors.

(61) The microcrystalline glass according to (60), wherein the colorant thereof comprises the following components in percentage by weight: NiO: 0-4%; and/or Ni$_2$O$_3$: 0-4'; and/or CoO: 0-2%; and/or Co$_2$O$_3$: 0-2%; and/or Fe$_2$O$_3$: 0-7%; and/or MnO$_2$: 0-4%; and/or Er$_2$O$_3$: 0-8%; and/or Nd$_2$O$_3$: 0-8%; and/or Cu$_2$O: 0-4%; and/or Pr$_2$O$_3$: 0-8%; and/or CeO$_2$: 0-4%.

(62) The microcrystalline glass according to (60) or (61), wherein the colorant thereof comprises the following components in percentage by weight: NiO: 0.1-4%; and/or Ni$_2$O$_3$: 0.1-4%; and/or CoO: 0.05-2%; and/or Co$_2$O$_3$: 0.05-2%; and/or Fe$_2$O$_3$: 0.2-7%; and/or MnO$_2$: 0.1-4%; and/or Er$_2$O$_3$: 0.4-8%; and/or Nd$_2$O$_3$: 0.4-8%; and/or Cu$_2$O: 0.5-4%; and/or Pr$_2$O$_3$: 0.4-8%; and/or CeO$_2$: 0.5-4%.

(63) The microcrystalline glass according to (60) or (61), wherein the colorant thereof comprises the following components in percentage by weight: NiO: 0.1-3%; and/or Ni$_2$O$_3$: 0.1-3%; and/or CoO: 0.05-1.8%; and/or Co$_2$O$_3$: 0.05-1.8%; and/or Fe$_2$O$_3$: 0.2-5%; and/or MnO$_2$: 0.1-3%; and/or Er$_2$O$_3$: 0.4-6%; and/or Nd$_2$O$_3$: 0.4-6'; and/or Cu$_2$O: 0.5-3%; and/or Pr$_2$O$_3$: 0.4-6%; and/or CeO$_2$: 0.5-3%.

(64) The microcrystalline glass according to (60) or (61), wherein the colorant thereof comprises the following components in percentage by weight: NiO: 0.1-3%; and/or $Ni_2O_3$: 0.1-3%.

(65) The microcrystalline glass according to (60) or (61), wherein the colorant thereof comprises the following components in percentage by weight: CoO: 0.05-1.8%; and/or $Co_2O_3$: 0.05-1.8%.

(66) The microcrystalline glass according to (60) or (61), wherein the colorant thereof comprises the following components in percentage by weight: $Cu_2O$: 0.5-3%; and/or $CeO_2$: 0.5-3%.

(67) The microcrystalline glass according to (60) or (61), wherein the colorant thereof comprises the following components in percentage by weight: $Fe_2O_3$: 0.2-5%, CoO: 0.05-0.3%; or $Fe_2O_3$: 0.2-5%, $Co_2O_3$: 0.05-0.3%; or $Fe_2O_3$: 0.2-5%, CoO: 0.05-0.3% and NiO: 0.1-1%; or $Fe_2O_3$: 0.2-5%, $Co_2O_3$: 0.05-0.3%, and NiO: 0.1-1%.

(68) The microcrystalline glass according to (60) or (61), wherein the colorant thereof comprises the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(69) The microcrystalline glass according to any of (60) or (61), wherein the colorant thereof comprises the following components in percentage by weight: $Er_2O_3$: 0.4-6%, $Nd_2O_3$: 0.4-4%, and $MnO_2$: 0.1-2%.

The present invention further provides a glass composition.

The technical solution of the present invention to solve the technical problem is that: (70) a glass composition, with a thermal expansion coefficient of ($\alpha_{20°\ C.-120°\ C.}$) of $45\times10^{-7}$/K-$70\times10^{-7}$/K, comprising the following components in percentage by weight: $SiO_2$: 65-85%: $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; SrO: 0-5%; BaO: 0-5%; $TiO_2$: 0-5%; $Y_2O_3$: 0-5%; $B_2O_3$: 0-3%; $Na_2O$: 0-3%; clarifiant: 0-2%.

(71) A glass composition, comprising the following components in percentage by weight: $SiO_2$: 65-85%; $Al_2O_3$: 1-15%; $Li_2$: 5-15%; $ZrO_2$: 0.1-10%; $P_2O$: 0.1-10%; $K_2O$: 0-10%; MgO: 0-10%; ZnO: 0-10%.

(72) A glass composition, comprising $SiO_2$, $Al_2O_3$ and $Li_2O$ as necessary components, wherein a refractive index (nd) thereof is 1.500-1.530, and a thermal expansion coefficient ($\alpha_{20°\ C.-120°\ C.}$) is $45\times10^{-7}$/K-$70\times10^{-7}$/K.

(73) The glass composition according to (72), comprising the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%.

(74) The glass composition according to any of (71)-(73), further comprising the following components in percentage by weight: SrO: 0-5%; BaO: 0-5%; $TiO_2$: 0-5%; $Y_2O_3$:0-5%; $B_2O_3$: 0-3%: $Na_2O$: 0-3%; clarifiant: 0-2%.

(75) A glass composition, comprising the following components in percentage by weight: $SiO_2$: 65-85%; $Al_2O_3$: 1-15%; $Li_2$: 5-15%: $ZrO_2$: 0.1-10%; $P_2O_5$: 0.1-10%: $K_2O$: 0-10%; MgO: 0-10%; ZnO: 0-10%; SrO: 0-5%; BaO: 0-5%; $TiO_2$: 0-5%; $Y_2O_3$: 0-5%; $B_2O_3$: 0-3%; $Na_2O$: 0-3%; clarifiant: 0-2%.

(76) The glass composition according to any of (70)-(75), comprising the following components in percentage by weight: $SiO_2$: 70-80%, preferably 70-76%; and/or $Al_2O_3$: 4-12%, preferably 4-10%; and/or $Li_2O$: 7-15%, preferably 8-12.5%; and/or $ZrO_2$: 0.5-6%, preferably 1-5%; and/or $P_2O_5$: 0.5-5%, preferably 1-2%; and/or $K_2O$: 0-5%, preferably 0-3%; and/or MgO: 0-5%, preferably 0.5-2%; and/or ZnO: 0-5%, preferably 0-3%; and/or SrO: 0-1%; and/or BaO: 0-1%; and/or $TiO_2$: 0-1%; and/or $Y_2O_3$: 0-1%; and/or $Na_2O$: 0-1%; and/or clarifiant: 0-1%.

(77) The glass composition according to any of (70)-(76), wherein the content of each component satisfies one or more of the following 6 conditions: 1) $(SiO_2+Li_2O)/Al_2O_3$ is 6-15, preferably 8-13, more preferably 8-12.5, further preferably 8.5-12; 2) $(Al_2O_3+Li_2O)/P_2O_5$ is 5-20, preferably 6-14, more preferably 8-14, further preferably 8.5-14; 3)$(SiO_2+Li_2O)/P_2O_5$ is 40-80, preferably 40-70, more preferably 42-60, further preferably 45-60; 4)$(SiO_2+Al_2O_3+Li_2O+ZrO_2)/P_2O_5$ is 40-90, preferably 45-85, more preferably 46-80, further preferably 48-80; 5) $(K_2O+MgO)/ZrO_2$ is 0.6-1.2, preferably 0.7-1.1, more preferably 0.8-1.0; 6) $Li_2O/(K_2O+ZrO_2)$ is 2.3-4.0, preferably 2.5-3.5, more preferably 2.8-3.3.

(78) The glass composition according to any of (70)-(77), comprising the following components in percentage by weight: $Li_2O$: 8% to less than 10%; not comprising SrO; and/or not comprising BaO; and/or not comprising $TiO_2$; and/or not comprising $Y_2O_3$; and/or not comprising $GeO_2$; and/or not comprising CaO; and/or not comprising $Cs_2O$; and/or not comprising PbO; and/or not comprising $As_2O_3$; and/or not comprising $La_2O_3$; and/or not comprising $Tb_2O_3$; and/or not comprising $Na_2O$; and/or not comprising $B_2O_3$.

(79) The glass composition according to any of (70)-(78), wherein the thermal expansion coefficient ($\alpha_{20°\ C.-120°\ C.}$) is $45\cdot10^{-7}$/K-$70\times10^{-7}$/K, preferably $50\times10^{-7}$/K-$70\times10^{-7}$/K.

(80) The glass composition according to any of (70)-(79), wherein the refractive index (nd) is 1.500-1.530, preferably 1.510-1.525.

(81) The glass composition according to any of (70)-(80), further comprising a colorant capable of making the glass composition show up in different colors.

(82) The glass composition according to (81), wherein the colorant thereof comprises the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(83) The glass composition according to (81) or (82), wherein the colorant thereof comprises the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.14%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(84) The glass composition according to (81) or (82), wherein the colorant thereof comprises the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(85) The glass composition according to (81) or (82), wherein the colorant thereof comprises the following components in percentage by weight: NiO: 0.1-3%; and/or $Ni_2O_3$: 0.1-3%.

(86) The glass composition according to (81) or (82), wherein the colorant thereof comprises the following components in percentage by weight: CoO: 0.05-1.8%; and/or $Co_2O_3$: 0.05-1.8%.

(87) The glass composition according to (81) or (82), wherein the colorant thereof comprises the following components in percentage by weight: $Cu_2O$: 0.5-3%; and/or $CeO_2$: 0.5-3%.

(88) The glass composition according to (81) or (82), wherein the colorant thereof comprises the following components in percentage by weight: $Fe_2O_3$: 0.2-5% and CoO: 0.05-0.3%; or $Fe_2O_3$: 0.2-5% and $Co_2O_3$: 0.05-0.3%; or $Fe_2O_3$: 0.2-5%, CoO: 0.05-0.3% and NiO: 0.1-1%; or $Fe_2O_3$: 0.2-5%, $Co_2O_3$: 0.05-0.3%, and NiO: 0.1-1%.

(89) The glass composition according to (81) or (82), wherein the colorant thereof comprises the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(90) The glass composition according to any of (81) or (82), wherein the colorant comprises the following components in percentage by weight: $Er_2O_3$: 0.4-6%, $Nd_2O_3$: 0.4-4%, $MnO_2$: 0.1-2%.

The present invention further provides a glass cover plate:

(91) A glass cover plate, comprising the microcrystalline glass product according to any of (1)-(37), and/or the microcrystalline glass according to any of (38)-(69), and/or the glass composition according to any of (70)-(90).

The present invention further provides a glass component:

(92) A glass component, comprising the microcrystalline glass product according to any of (1)-(37), and/or the microcrystalline glass according to any of (38)-(69), and/or the glass composition according to any of (70)-(90).

The present invention further provides a display device:

(93) A display device, comprising the microcrystalline glass product according to any of (1)-(37), and/or the microcrystalline glass according to any of (38)-(69), and/or the glass composition according to any of (70)-(90), and/or the glass cover plate according to (91).

The present invention further provides an electronic device:

(94) An electronic device, comprising the microcrystalline glass product according to any of (1)-(37), and/or the microcrystalline glass according to any of (38)-(69), and/or the glass composition according to any of (70)-(90), and/or the glass cover plate according to (91), and/or the glass component according to (92).

The present invention further provides a manufacturing method for the microcrystalline glass product.

The technical solution of the present invention to solve the technical problem is: (95) a manufacturing method for a microcrystalline glass product, comprising the following steps: forming a glass composition, comprising the following components in percentage by weight: $SiO_2$: 65-85%; $Al_2O_3$: 1-15%; $Li_2$: 5-15%; $ZrO_2$: 0.1-10%; $P_2O_5$: 0.1-10%; $K_2O$: 0-10%; MgO: 0-10%; ZnO: 0-10%; SrO: 0-5%; BaO: 0-5%; $TiO_2$: 0-5%; $Y_2O_3$: 0-5%; $B_2O_3$: 0-3%; $Na_2O$: 0-3%; clarifiant: 0-2%, forming a microcrystalline glass with the glass composition through a crystallization technology, wherein the main crystal phase of the microcrystalline glass comprises lithium silicate and a quartz crystal phase, and then forming a microcrystalline glass product with the microcrystalline glass through a chemical tempering technology, wherein a four-point bending strength of the microcrystalline glass product is above 600 MPa.

(96) The manufacturing method for the microcrystalline glass product according to (95), wherein the glass composition comprises the following components in percentage by weight: $SiO_2$: 70-80%, preferably 70-76%; and/or $Al_2O_3$: 4-12%, preferably 4-10%; and/or $Li_2O$: 7-15%, preferably 8-12.5%; and/or $ZrO_2$: 0.5-6%, preferably 1-5%; and/or $P_2O_5$: 0.5-5%, preferably 1-2%; and/or $K_2O$: 0-5%, preferably 0-3%; and/or MgO: 0-5%, preferably 0.5-2%; and/or ZnO: 0-5%, preferably 0-3%; and/or SrO: 0-1%; and/or BaO: 0-1%; and/or $TiO_2$: 0-1%; and/or $Y_2O_3$: 0-1%; and/or $Na_2O$: 0-1%; and/or clarifiant: 0-1%.

(97) The manufacturing method for the microcrystalline glass product according to any of (95) or (96), wherein the content of each component of the glass composition satisfies one or more of the following 6 conditions: 1)$(SiO_2+Li_2O)/Al_2O_3$ is 6-15, preferably 8-13, more preferably 8-12.5, further preferably 8.5-12; 2) $(Al_2O_3+Li_2O)/P_2O_5$ is 5-20, preferably 6-14, more preferably 8-14, further preferably 8.5-14; 3) $(SiO_2+Li_2O)/P_2O_5$ is 40-80, preferably 40-70, more preferably 42-60, further preferably 45-60; 4) $(SiO_2+Al_2O_3+Li_2O+ZrO_2)/P_2O_5$ is 40-90, preferably 45-85, more preferably 46-80, further preferably 48-80; 5) $(K_2O+MgO)/ZrO_2$ is 0.6-1.2, preferably 0.7-1.1, more preferably 0.8-1.0; 6) $Li_2O/(K_2O+ZrO_2)$ is 2.3-4.0, preferably 2.5-3.5, more preferably 2.8-3.3.

(98) The manufacturing method for the microcrystalline glass product according to any of (95)-(97), wherein the crystallization technology comprises the following steps: heating to a predetermined crystallization treatment temperature, keeping for a certain period of time after reaching a thermal treatment temperature, and then cooling, the crystallization treatment temperature is preferably 490-800° C., more preferably 550-750° C.; and the holding time is preferably 0-8 h, more preferably 1-6 h at the crystallization treatment temperature.

(99) The manufacturing method for the microcrystalline glass product according to any of (95)-(97), wherein the crystallization technology comprises the following steps: conducting a nucleus formation technology at a first temperature, and then conducting a crystal growth technology at a second temperature higher than that of the nucleus formation technology.

(100) The manufacturing method for the microcrystalline glass product according to (99), wherein the crystallization technology comprises the following steps: the first temperature is 490-650° C., and the second temperature is 600-850° C., the holding time at the first temperature is 0-24 h, preferably 2-15 h, and the holding time at the second temperature is 0-10 h, preferably 0.5-6 h.

(101) The manufacturing method for the microcrystalline glass product according to any of (95)-(100), wherein the chemical tempering technology comprises the step of: immersing the microcrystalline glass into a salt bath of a molten Na salt at a temperature of 430° C.-470° C. for about 6-20 h, wherein the preferred temperature ranges from 435° C. to 460° C., and the preferred time ranges from 8 to 13 h; and/or immersing the microcrystalline glass in a salt bath of molten K salt at a temperature of 400° C.-450° C. for 1-8 h, wherein the preferred time ranges from 2 to 4 h.

(102) The manufacturing method for the microcrystalline glass product according to any of (95)-(100), through chemically tempered for 8 h in the salt bath of the molten Na salt at 450° C., a depth of an ion exchange layer of the microcrystalline glass product is above 80 μm, preferably above 85 μm.

(103) The manufacturing method for the microcrystalline glass product according to any of (95)-(102), wherein the main crystal phase of the microcrystalline glass product comprises lithium disilicate and a quartz crystal phase and/or petalite.

(104) The manufacturing method for the microcrystalline glass product according to any of (95)-(103), wherein the crystallinity of the microcrystalline glass product is above 50%, preferably above 65%, more preferably above 70%, further preferably above 75%.

(105) The manufacturing method for the microcrystalline glass product according to any of (95)-(103), wherein the surface stress of the microcrystalline glass product is above 200 MPa, preferably above 250 MPa, more preferably above 300 MPa.

(106) The manufacturing method for the microcrystalline glass product according to any of (95)-(105), wherein the depth of the ion exchange layer of the microcrystalline glass product is above 30 μm, preferably above 50 μm, more preferably above 60 μm, further preferably above 80 μm.

(107) The manufacturing method for the microcrystalline glass product according to any of (95)-(106), wherein a falling ball test height of the microcrystalline glass product is above 700 mm, preferably above 800 mm, more preferably above 1,000 mm, further preferably above 1,200 mm.

(108) The manufacturing method for the microcrystalline glass product according to any of (95)-(107), wherein a fracture toughness of the microcrystalline glass product is above 1 MPa·m$^{1/2}$, preferably above 1.3 MPa·m$^{1/2}$, more preferably above 1.5 MPa·m$^{1/2}$.

(109) The manufacturing method for the microcrystalline glass product according to any of (95)-(108), wherein a four-point bending strength of the microcrystalline glass product is above 600 MPa, preferably above 650 MPa, more preferably above 700 MPa.

(110) The manufacturing method for the microcrystalline glass product according to any of (95)-(109), wherein the haze of the microcrystalline glass product with a thickness of 0.55 mm is below 0.6%, preferably below 0.5%, more preferably below 0.4%.

(111) The manufacturing method for the microcrystalline glass product according to any of (95)-(110), wherein a grain size of the microcrystalline glass product is below 100 nm, preferably below 80 nm, more preferably below 60 nm, further preferably below 50 nm, still further preferably below 40 nm.

(112) The manufacturing method for the microcrystalline glass product according to any of (95)-(111), wherein a thermal refractive index coefficient of the microcrystalline glass product is below −0.5×10$^{−6}$/° C., preferably below −0.8×10$^{−6}$/° C., more preferably below −1.1×10$^{−6}$/° C.

(113) The manufacturing method for the microcrystalline glass product according to any of (95)-(112), wherein an average light transmittance of the microcrystalline glass product for a thickness of 1 mm at a wavelength of 400-800 nm is above 80%, preferably above 85%, more preferably above 88%.

(114) The manufacturing method for the microcrystalline glass product according to any of (95)-(113), wherein a light transmittance of the microcrystalline glass product for a thickness of 0.55 mm at a wavelength of 550 nm is above 80%, preferably above 85%, more preferably above 88%, further preferably above 91%.

The present invention further provides a manufacturing method for a microcrystalline glass.

The technical solution of the present invention to solve the technical problem is: (115) a manufacturing method for a microcrystalline glass, comprising the following steps of: forming a glass composition, comprising the following components in percentage by weight: $SiO_2$: 65-85%; $Al_2O_3$: 1-15%; $Li_2O$: 5-15%; $ZrO_2$: 0.1-10%; $P_2O_5$: 0.1-10%; $K_2O$: 0-10%; MgO: 0-10%; ZnO: 0-10%; SrO: 0-5%; BaO: 0-5%; $TiO_2$: 0-5%; $Y_2O_3$: 0-5%; $B_2O_3$: 0-3%; $Na_2O$: 0-3%; clarifiant: 0-2%, forming a microcrystalline glass with the glass composition through a crystallization technology, wherein the main crystal phase of the microcrystalline glass comprises lithium silicate and a quartz crystal phase, and the haze of the microcrystalline glass of the thickness of 0.55 mm is below 0.6%.

(116) The manufacturing method for the microcrystalline glass according to (115), wherein the glass composition comprises the following components in percentage by weight: $SiO_2$: 70-80%, preferably 70-76%; and/or $Al_2O_3$: 4-12%, preferably 4-10%; and/or $Li_2O$: 7-15%, preferably 8-12.5%; and/or $ZrO_2$: 0.5-6%, preferably 1-5%; and/or $P_2O_5$: 0.5-5%, preferably 1-2%; and/or $K_2O$: 0-5%, preferably 0-3%; and/or MgO: 0-5%, preferably 0.5-2%; and/or ZnO: 0-5%, preferably 0-3%; and/or SrO: 0-1%; and/or BaO: 0-1%; and/or $TiO_2$: 0-1%; and/or $Y_2O_3$: 0-1%; and/or $Na_2O$: 0-1%; and/or clarifiant: 0-1%.

(117) The manufacturing method for the microcrystalline glass according to any of (115)-(116), wherein the content of each component of the glass composition satisfies one or more of the following 6 conditions: 1) $(SiO_2+Li_2O)/Al_2O_3$ is 6-15, preferably 8-13, more preferably 8-12.5, further preferably 8.5-12; 2) $(Al_2O_3+Li_2O)/P_2O_5$ is 5-20, preferably 6-14, more preferably 8-14, further preferably 8.5-14; 3) $(SiO_2+Li_2O)/P_2O_5$ is 40-80, preferably 40-70, more preferably 42-60, further preferably 45-60; 4) $(SiO_2+Al_2O_3+Li_2O+ZrO_2)/P_2O_5$ is 40-90, preferably 45-85, more preferably 46-80, further preferably 48-80; 5) $(K_2O+MgO)/ZrO_2$ is 0.6-1.2, preferably 0.7-1.1, more preferably 0.8-1.0; 6) $Li_2O/(K_2O+ZrO_2)$ is 2.3-4.0, preferably 2.5-3.5, more preferably 2.8-3.3.

(118) The manufacturing method for the microcrystalline glass according to any of (115)-(117), wherein the crystallization technology comprises the following steps: heating to a predetermined crystallization treatment temperature, keeping for a certain period of time after reaching a thermal treatment temperature, and then cooling; the crystallization treatment temperature is preferably 490-800° C., more preferably 550-750° C.; and the holding time is preferably 0-8 h, more preferably 1-6 h at the crystallization treatment temperature.

(119) The manufacturing method for the microcrystalline glass according to any of (115)-(117), wherein the crystallization technology comprises the following steps: conducting a nucleus formation technology at a first temperature, and then conducting a crystal growth technology at a second temperature higher than that of the nucleus formation technology.

(120) The manufacturing method for the microcrystalline glass according to (119), wherein the crystallization technology comprises the following steps: the first temperature is 490-650° C., and the second temperature is 600-850° C., the holding time at the first temperature is 0-24 h, preferably 2-15 h, and the holding time at the second temperature is 0-10 h, preferably 0.5-6 h.

(121) The manufacturing method for the microcrystalline glass according to any of (115)-(120), wherein the main crystal phase of the microcrystalline glass comprises lithium disilicate and a quartz crystal phase and/or petalite.

(122) The manufacturing method for the microcrystalline glass according to any of (115)-(121), wherein a crystallinity of the microcrystalline glass is above 50%, preferably above 65%, more preferably above 70%, further preferably above 75%.

(123) The manufacturing method for the microcrystalline glass according to any of (115)-(122), wherein the haze of the microcrystalline glass with a thickness of 0.55 mm is below 0.6%, preferably below 0.5%, more preferably below 0.4%.

(124) The manufacturing method for the microcrystalline glass according to any of (115)-(123), wherein a grain size of the microcrystalline glass is below 100 nm, preferably below 80 nm, more preferably below 60 nm, further preferably below 50 nm, still further preferably below 40 nm.

(125) The manufacturing method for the microcrystalline glass according to any of (115)-(124), wherein a thermal refractive index coefficient of the microcrystalline glass product is below $-0.5\times10^{-6}/°$ C., preferably below $-0.8\times10^{-6}/°$ C., more preferably below $-1.1\times10^{-6}/°$ C.

(126) The manufacturing method for the microcrystalline glass according to any of (115)-(125), wherein an average light transmittance of the microcrystalline glass for a thickness of 1 mm at a wavelength of 400-800 nm is above 80%, preferably above 85%, more preferably above 88%.

(127) The manufacturing method for the microcrystalline glass according to any of (115)-(126), wherein a light transmittance of the microcrystalline glass for a thickness of 0.55 mm at a wavelength of 550 nm is above 80%, preferably above 85%, more preferably above 88%, further preferably above 91%.

The present invention has the following beneficial effects: through reasonable components design, the microcrystalline glass and the microcrystalline glass product provided by the present invention have an excellent mechanical property, thereby being applicable to the electronic device or the display device.

DETAILED DESCRIPTION

A microcrystalline glass and a microcrystalline glass product provided by the present invention are materials with a crystal phase and a glass phase, both of which differ from an amorphous solid. The crystal phases of the microcrystalline glass and the microcrystalline glass product can be distinguished by TEMEDX and by the peak angles appearing on the X-ray diffraction pattern of the X-ray diffraction analysis, and the main crystal phase is measured by the X-ray diffraction.

The inventors of the present invention, through repeated tests and studies, have obtained the microcrystalline glass or the microcrystalline glass product provided by the present invention at a low cost by prescribing the contents and content ratios of specific ingredients constituting the microcrystalline glass and the microcrystalline glass product as specific values and separating out specific crystal phases.

The composition range of each ingredient of the glass composition, the microcrystalline glass or the microcrystalline glass product will be described below. In the Description, unless otherwise specified, the content of each component is represented by wt % relative to the total amount of glass substances converted into the composition of oxides. Here, the "converted into the composition of oxides" refers to that the total amount of the oxide substances is 100% under the condition that the oxides, composite salts and hydroxides, used as raw materials for the ingredients of the glass composition, the microcrystalline glass or the microcrystalline glass product provided by the present invention, are decomposed and converted into the oxide when molten. Besides, in the Description, the glass composition before crystallized is only called the glass, the glass composition after crystallized is called the microcrystalline glass, and the microcrystalline glass product refers to the microcrystalline glass chemically tempered.

Unless otherwise specified in specific circumstances, the numerical value range listed herein includes maximum and minimum values: "above" and "below" include endpoint values; all integers and fractions within this range are not limited to specific values listed when the range is limited. The term "about" used herein refers to that formulas, parameters, other quantities and features are not and need not to be exact, but can be approximate and/or bigger or smaller if required, which reflects tolerances, conversion factors and measurement errors, etc. "And/or" as referred to herein is inclusive, for instance "A and/or B" refers to only A or only B, or both A and B simultaneously.

The glass, the microcrystalline glass and the microcrystalline glass product provided by the present invention can be summarized as lithium-containing aluminosilicate glass, microcrystalline glass and microcrystalline glass product, containing $SiO_2$, $Al_2O_3$ and $Li_2O$, and besides, further containing $ZrO_2$, $P_2O_5$ and other ingredients. In some embodiments, depending on the glass composition, the first main crystal phase of microcrystalline glass and microcrystalline glass product is lithium silicate; in some embodiments, the first main crystal phase is petalite; in some embodiments, the first main crystal phase is quartz crystal phase (including two situations: quartz or quartz and quartz solid solution). In some embodiments, the main crystal phase includes lithium silicate and quartz crystal phase. In some embodiments, the main crystal phase includes lithium silicate and petalite. In some embodiments, the first crystal phase is lithium silicate, and a second main crystal phase is quartz crystal phase; in some embodiments, the first crystal phase is quartz crystal phase, and the second main crystal phase is lithium silicate; in some embodiments, the first crystal phase is lithium silicate, and the second main crystal phase is petalite; in some embodiments, the first crystal phase is petalite, and the second main crystal phase is lithium silicate. In some embodiments, the main crystal phase includes lithium silicate, petalite and quartz crystal phase; in some embodiments, the first crystal phase is lithium silicate, the second main crystal phase is petalite, and a third main crystal phase is quartz crystal phase; in some embodiments, the first crystal phase is lithium silicate, the second main crystal phase is quartz crystal phase, and the third main crystal phase is petalite; in some embodiments, the first main crystal phase is petalite, the second main crystal phase is lithium silicate, and the third main crystal phase is quartz crystal phase; in some embodiments, the first crystal phase is quartz crystal phase, the second main crystal phase is lithium silicate, and the third main crystal phase is petalite. In some embodiments, the quartz crystal phase is α-hexagonal quartz crystal phase; in some embodiments, the lithium silicate is lithium disilicate; or β-spodumeness, lithium phosphate and so on, as a secondary crystal phase, can be present as well. It should be noted that the quartz crystal phase as referred to herein includes only containing quartz crystal, or containing quartz and quartz solid solution.

In some embodiments, the glass phase remained in the microcrystalline glass and the microcrystalline glass product is 8-45% by weight; 10-40% in some embodiments; 12-40% in some embodiments; 15-40% in some embodiments; 15-35% in some embodiments; 15-32% in some embodiments; 20-45% in some embodiments; 20-40% in some embodiments; 32-45% in some embodiments; 32-40% in some embodiments; 35-45% in some embodiments.

The fracture toughness of the microcrystalline glass gets higher when the main crystal phase of the microcrystalline glass is one of quartz crystal phase, lithium silicate and petalite or combination thereof. When the main crystal phase of the microcrystalline glass is quartz crystal phase and lithium disilicate, the thermal refractive index coefficient of the microcrystalline glass gets lower, but the fracture toughness gets higher; the falling ball test height and four-point bending strength of the microcrystalline glass product get higher.

In the present invention, the main crystal phase accounts for 50-92% by weight of the microcrystalline glass or the microcrystalline glass product; 60-90% in some embodiments; 65-85% in some embodiments; 70-80% in some embodiments; 80-92% in some embodiments. The main crystal phase as referred to herein refers to the crystal phase having a higher weight percentage than other crystal phases in the microcrystalline glass or the microcrystalline glass product.

In some embodiments, the quartz crystal phase of the microcrystalline glass or the microcrystalline glass product is below 70% by weight; in some embodiments, the quartz crystal phase of the microcrystalline glass or the microcrystalline glass product is below 65% by weight; in some embodiments, the quartz crystal phase of the microcrystalline glass or the microcrystalline glass product is below 60%; in some embodiments, the quartz crystal phase of the microcrystalline glass or the microcrystalline glass product is below 55% by weight; in some embodiments, the quartz crystal phase of the microcrystalline glass or the microcrystalline glass product is below 50% by weight; in some embodiments, the quartz crystal phase of the microcrystalline glass or the microcrystalline glass product is below 45% by weight.

In some embodiments, the lithium silicate crystal phase of the microcrystalline glass or the microcrystalline glass product is below 55% by weight; in some embodiments, the lithium silicate crystal phase of the microcrystalline glass or the microcrystalline glass product is below 50% by weight; in some embodiments, the lithium silicate crystal phase of the microcrystalline glass or the microcrystalline glass product is below 45% by weight; in some embodiments, the lithium silicate crystal phase of the microcrystalline glass or the microcrystalline glass product is below 40% by weight.

In some embodiments, the petalite crystal phase of the microcrystalline glass or the microcrystalline glass product is below 40% by weight. in some embodiments, the petalite crystal phase of the microcrystalline glass or the microcrystalline glass product is below 35% by weight; in some embodiments, the petalite crystal phase of the microcrystalline glass or the microcrystalline glass product is below 30% by weight; in some embodiments, the petalite crystal phase of the microcrystalline glass or the microcrystalline glass product is below 25% by weight; in some embodiments, the petalite crystal phase of the microcrystalline glass or the microcrystalline glass product is less than 20% by weight; in some embodiments, the petalite crystal phase of the microcrystalline glass or the microcrystalline glass product is below 15% by weight.

$SiO_2$, as a basic ingredient of the glass composition provided by the present invention, can be used for stabilizing the reticular structures of glass and microcrystalline glass, and is one of ingredients constituting lithium silicate, quartz crystal phase and petalite after crystallized. If the $SiO_2$ content is below 65%, crystals formed in the microcrystalline glass decrease and the crystals get thicker easily, which will affect the hazes of the microcrystalline glass and the microcrystalline glass product, as well as the falling ball test height of the microcrystalline glass product. Hence, the minimum $SiO_2$ content is 65%, preferably 70%; if the $SiO_2$ content is above 85%, the glass melting temperature is high, the melting is difficult, and forming is uneasy, which will affect the glass consistency. Hence, the maximum $SiO_2$ content is preferably 85%, preferably 80%, further preferably 76%. In some embodiments, about 66%, 67%, 68%, 69%, 70%, 71%, 72%, 73%, 74%, 75%, 76%, 77%, 78%, 79%, 80%, 81%, 82%, 83% or 84% of $SiO_2$ can be contained.

$Al_2O_3$ is an ingredient for forming a reticular glass, which is an important ingredient capable of helping to stabilize glass forming and improving the chemical stability, and of improving the mechanical property of the glass and increasing the depth of the ion exchange layer and the surface stress of the microcrystalline glass product. However, if its content is less than 1%, the effect is poor. Hence, the minimum $Al_2O_3$ content is 1%, preferably 4%. On the other hand, if the $Al_2O_3$ content is more than 15%, the glass meltability and devitrification resistance decrease, and the crystals get bigger at crystallization, so as to lower the strength of the microcrystalline glass and the microcrystalline glass product. Hence, the maximum $Al_2O_3$ content is 15%, preferably 12%, more preferably 10%. In some embodiments, about 1%, 2%, 3%, 4%, 5%, 6%, 7%, 8%, 9%, 10%, 11%, 12%, 13%, 14% or 15% of $Al_2O_3$ can be contained.

$Li_2O$ becomes a necessary ingredient for forming the crystal phase after crystallization, which is conducive to forming the lithium-containing crystal phase, such as lithium silicate and petalite, and is also a necessary chemically strengthened ingredient. However, if the content thereof is less than 5%, the effect is poor. Hence, if the minimum $Li_2O$ content is 5%, preferably 7%, more preferably 8%, and further preferably 9% in some embodiments; on the other hand, if excessive $Li_2O$ is contained, the chemical stability of the glass decreases easily, and the light transmittance of the microcrystalline glass and the microcrystalline glass product degrade. Hence, the maximum $Li_2O$ content is preferably 15%, more preferably 12.5%, further preferably less than 10% in some embodiments. In some embodiments, 5%, 6%, 7%, 8%, 9%, 9.8%, 10%, 11%, 12%, 13%, 14% or 15% of $Li_2O$ can be contained.

The inventors, through massive experimental studies, have found that the thermal expansion coefficient of the glass, and the hazes and grain sizes of microcrystalline glass and the microcrystalline glass product can be affected by introducing a certain percentage of $SiO_2$, $Li_2O$ and $Al_2O_3$. Particularly, $(SiO_2+Li_2O)/Al_2O_3$ is in a range of 6-15, the glass can have a low thermal expansion coefficient, small grains can be obtained after crystallization, and the mechanical property of the microcrystalline glass and the microcrystalline glass product can be improved. In some embodiments, $(SiO_2+Li_2O)/Al_2O_3$ is preferably 8-13, more preferably 8-12.5, and low haze can be obtained, so that the microcrystalline glass and the microcrystalline glass product have the excellent light transmittance; further preferably, when $(SiO_2+Li_2O)/Al_2O_3$ is 8.5-12, the effect is particularly obvious. In some embodiments, a value of $(SiO_2+Li_2O)/Al_2O_3$ can be 6, 6.5, 7, 7.5, 8, 8.5, 9, 9.5, 10, 10.5, 11, 11.5, 12, 12.5, 13, 13.5, 14, 14.5 or 15.

$P_2O_5$ is an optional ingredient capable of helping to improve the low temperature melting of the glass, conducting phase splitting in the glass to form a crystal nucleus, and promoting the thermal expansion stability during the crystallization; the minimum $P_2O_5$ content is preferably 0.1, more preferably 0.5%, further preferably 1%; but excessive $P_2O_5$ contained easily makes the glass produce lower devitrification resistance and phase splitting in glass, and the mechanical property of the glass has a degradation trend. Hence, the maximum $P_2O_5$ content is 10%, preferably 5%, more preferably 2%. In some embodiments, about 0%, 0.1%, 0.3%, 0.5%, 1%, 2%, 3%, 4%, 5%, 6%, 7%, 8%, 9% or 10% of $P_2O_5$ can be contained.

The depth of the ion exchange layer of the microcrystalline glass product can be optimized by controlling the value of $(SiO_2+Li_2O)/P_2O_5$ in a range of 40-80, and particularly the deeper ion exchange layer of the microcrystalline glass product can be obtained by controlling the value of $(SiO_2+Li_2O)/P_2O_5$ in a range of 40-70, more preferably 42-60, further preferably 45-60; In some embodiments, when the value of $(SiO_2+Li_2O)/P_2O_5$ is in a range of 40-70, more preferably 42-60, further preferably 45-60, the crystallization process is favorable for the formation of quartz crystal phase and lithium disilicate. Furthermore, the microcrystalline glass and the microcrystalline glass product can have an excellent thermal refractive index coefficient, which can reach below $-0.5\times10^{-6}/°$ C., preferably below $-0.8\times10^{-6}/°$ C., further preferably below $-1.1\times10^{-6}/°$ C. The refractive index change difference caused by temperature difference between the glass phase and all crystal phases in the microcrystalline glass and the microcrystalline glass product decreases to avoid the decrease of the light transmittance of the microcrystalline glass or the microcrystalline glass product due to the temperature variations. In some embodiments, the value of $(SiO_2+Li_2O)/P_2O_5$ can be 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70.

The inventors, through massive experimental studies, have found that the introducing ratios of $Al_2O_3$, $Li_2O$ and $P_2O_5$ into the glass have a great influence on the surface stresses and the four-point bending strengths of the microcrystalline glass and the microcrystalline glass product. Particularly, the surface stresses of the microcrystalline glass and the microcrystalline glass product can be improved when $(Al_2O_3+Li_2O)/P_2O_5$ is in a range of 5-20, preferably 6-14. In some embodiments, $(Al_2O_3+Li_2O)/P_2O_5$ is more preferably 8-14, further preferably 8.5-14, so that the quartz crystal phase and the lithium disilicate can be formed easily, and the four-point bending strengths of the microcrystalline glass and the microcrystalline glass product are improved obviously, In some embodiments, the four-point bending strengths of the microcrystalline glass and the microcrystalline glass product are above 600 MPa, preferably above 650 MPa, more preferably above 700 MPa. In some embodiments, the value of $(Al_2O_3+Li_2O)/P_2O_5$ can be 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20.

$ZrO_2$ has the effect of crystallizing and separating to form the crystal nucleus, and meanwhile has an optional ingredient which helps to improve the chemical stability of the glass. Studies have found that $ZrO_2$ can significantly lower the glass devitrification and liquidus temperature in the forming process, in order to improve the stability of the $Li_2O$—$Al_2O_3$—$SiO_2$—$P_2O_5$ glass. In the present invention, the minimum $ZrO_2$ content is preferably 0.1%, more preferably 0.5%, further preferably 1%; however, if excessive $ZrO_2$ is contained, the devitrification resistance of the glass will decrease easily, and meanwhile, the control difficulty will increase in the glass crystallization process. Hence, the maximum $ZrO_2$ content is 10%, preferably 6%, more preferably 5%. In some embodiments, about 0%, 0.1%, 0.3%, 0.5%, 1%, 2%, 3%, 4%, 5%, 6%, 70, 8%, 9% or 10% of $ZrO_2$ can be contained.

During the massive experimental studies, the inventors have found that the microcrystalline glass product can be subject to falling ball impact from above 700 mm by controlling the ratio of the total content of $SiO_2$, $Al_2O_3$, $Li_2O$ and $ZrO_2$ to the introducing amount of $P_2O_5$ $((SiO_2+Al_2O_3+Li_2O+ZrO_2)/P_2O_5)$ in a range of 40-90, preferably 45-85; particularly in some embodiments, when $(SiO_2+Al_2O_3+Li_2O+ZrO_2)/P_2O_5$ is in a range of 46-80, the lithium disilicate and the quartz crystal phase are formed easier, and the microcrystalline glass product easier obtains the excellent fracture toughness, which can be above 1 MPa·m$^{1/2}$, preferably above 1.3 MPa·m$^{1/2}$, more preferably above 1.5 MPa·m$^{1/2}$; and meanwhile, the bearing capacity of the falling ball test height is further optimized, $(SiO_2+Al_2O_3+Li_2O+ZrO_2)/P_2O_5$ is further preferably 48-80, the falling ball test height is above 700 mm, preferably above 800 mm, more preferably above 1,000 mm, further preferably above 1,200 mm. In some embodiments, $(Si_2+Al_2O_3+Li_2O+ZrO_2)/P_2O_5$ can be 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90.

$K_2O$ is an optional ingredient which helps to improve the low-temperature meltability and formality of the glass. But excessive $K_2O$ contained can easily lead to the decrease of the glass chemical durability and the increase of the average linear expansion coefficient. Hence, the $K_2O$ content is 0-10%, preferably 0-5%, more preferably 0-3%. In some embodiments, about 0%, more than 0%, 0.1%, 0.3%, 0.5%, 1%, 2%, 3%, 4%, 5%, 6%, 7%, 8%, 9% or 10% of $K_2O$ can be contained.

In the present invention, when the ratio of $Li_2O$ to the total content of $K_2O$ and $ZrO_2$ ($K_2O+ZrO_2$), namely $Li_2O/(K_2O+ZrO_2)$, is in a range of 2.3-4.0, the crystallization property of the microcrystalline glass can be optimized, and the microcrystalline glass and the microcrystalline glass product have a proper amount of crystallinity, thereby making the microcrystalline glass and the microcrystalline glass product have an excellent property; when $Li_2O/(K_2O+ZrO_2)$ is preferably 2.5-3.5, more preferably 2.8-3.3, the microcrystalline glass and the microcrystalline glass product falling ball test heights get bigger. In some embodiments, the ball test heights are preferably above 800 mm, more preferably above 1,000 mm, further preferably above 1,200 mm. In some embodiments, the value of $Li_2O/(K_2O+ZrO_2)$ can be 2.3, 2.4, 2.5, 2.6, 2.7, 2.8, 2.9, 3.0, 3.1, 3.2, 3.3, 3.4, 3.5, 3.6, 3.7, 3.8, 3.9 or 4.0.

ZnO can improve the melting property of the glass and the chemical stability of the glass, and refine grains in crystallization. The devitrification decrease can be restrained by controlling the maximum ZnO content below 10%. Hence, the maximum ZnO content is 10%, preferably 5%, more preferably 3%. In some embodiments, about 0%, more than 0%, 0.1%, 0.5%, 1%, 2%, 3%, 4%, 5%, 6%, 7%, 8%, 9% or 10% of ZnO can be contained.

MgO is conducive to decreasing the glass viscosity, restricting the glass devitrification in forming and refining grans in crystallization, and has the effect of improving the low temperature melting; MgO is an optional ingredient in the present invention, with the content of above 0.3% preferably; however, if the MgO content is high, the decrease of the devitrification resistance may be caused, and the non-ideal crystals may be obtained to result in the property decline of the microcrystalline glass and the microcrystalline glass product. Hence, the maximum MgO content is 10%, preferably 5%, more preferably 2%. In some embodiments, about 0%, more 0%, 0.5%, 1%, 2%, 3%, 4%, 5%, 6%, 7%, 8%, 9% or 10% of MgO can be contained.

The inventors, through massive experimental studies, have found that, when the ratio of the total content of $K_2O$ and MgO($K_2O+MgO$) to the introducing amount of $ZrO_2$, namely $(K_2O+MgO)/ZrO_2$, is in a range of 0.6-1.2, a synergistic effect can be conducted with $Li_2O$, so that the microcrystalline glass and the microcrystalline glass product have an approximate amount of crystallinity and an excellent property; and meanwhile, studies have found that, by preferably controlling $(K_2O+MgO)/ZrO_2$ to be 0.7-1.1, the grains can be refined, and the light transmittance and the mechanical strength can be more excellent; preferably, when $(K_2O+MgO)/ZrO_2$ is preferably 0.8-1.0, in some embodiments, the four-point bending strengths of the microcrystalline glass and the microcrystalline glass product get higher, are preferably above 650 MPa, more preferably above 700 MPa. In some embodiments, $(K_2O+MgO)/ZrO_2$ can be 0.6, 0.65, 0.7, 0.75, 0.8, 0.85, 0.9, 0.95, 1.0, 1.05, 1.1, 1.15 or 1.2.

SrO is an optional ingredient capable of improving the low temperature melting property of the glass and restraining the forming devitrification. In the present invention, the microcrystalline glass and the microcrystalline glass product can obtain excellent grain sizes when SrO is preferably controlled below 5%, preferably below 1%, and in some embodiments, preferably not introduced. In some embodiments, about 0%, more than 0%, 0.3%, 0.5%, 1%, 2%, 3%, 4% or 5% of SrO can be contained.

BaO is an optional ingredient which helps to improve the glass forming property of the glass, and when the content thereof is more than 5%, the devitrification resistance of the glass decreases. Hence, the BaO content is preferably controlled below 5% in the present invention, more preferably below 1%, and in some embodiments, preferably not introduced. In some embodiments, about 0%0, more than 0%, 0.3%, 0.5%, 1%, 2%, 3%, 4% or 5% of BaO can be contained.

$TiO_2$ is an optional ingredient which helps to lower the glass melting temperature and improve the chemical stability. In the present invention, the glass crystallization process can be controlled easily when below 5% is introduced, preferably below 1%, and in some embodiments, preferably not introduced. In some embodiments, about 0%, more than 0%, 0.3%, 0.5%, 1%, 2%, 3%, 4% or 5% of $TiO_2$ can be contained.

$Y_2O_3$ is an optional ingredient capable of improving the glass hardness and the chemical stability, but its excessive content will easily cause glass devitrification. Its content is below 5%, preferably below 1%, and in some embodiments, preferably not introduced. In some embodiments, about 0%, more than 0%, 0.3%, 0.5%, 1%, 2%, 3%, 4% or 5% of $Y_2O_3$ can be contained.

$Na_2O$ is any ingredient capable of improving the glass meltability. If the content thereof is high, the separated crystal phase gets bigger or the separated crystal phase varies in the crystallization process. Hence, without damaging the properties of the microcrystalline glass and the microcrystalline glass product provided by the present invention, the microcrystalline glass product can preferably contain below 5% of $Na_2O$, more preferably below 3% of $Na_2O$, further preferably below 1% of $Na_2O$; the glass and the microcrystalline glass can preferably contain below 3% of $Na_2O$, more preferably below 1% of $Na_2O$, and in some embodiments, preferably not contain $Na_2O$. In some embodiments, about 0%, more than 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.00%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0% of $Na_2O$ can be contained.

$B_2O_3$ contributes to providing the glass with a low melting temperature. When the content thereof is high, the chemical stability of the glass decreases. Hence, the $B_2O_3$ content is below 3%, and in some embodiments, preferably 0.1-2%; in some embodiments, preferably not introduced. In some embodiments, about 0%, more than 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0% of $B_2O_3$ can be contained.

When one or more of $Sb_2O_3$, $SnO_2$ and SnO is added as the clarifiant, the maximum $Sb_2O_3$ content is 2%, preferably 1%, more preferably 0.5%. The maximum $SnO_2$ and SnO contents are respectively 2%, preferably 1%, more preferably 0.5%. In some embodiments, the content of one or more of the above three clarifiants is about 0%, more than 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%.

In some embodiments, the compounds of $As_2O_3$, Cl and Br can be used as the clarifiants, the contents of which are respectively below 2%, preferably below 1%, more preferably below 0.5%.

In an attempt to obtain the proper grain size and crystal phase variety in the present invention, $La_2O_3$, $Cs_2$, $Tb_2O_3$, $GeO_2$ and CaO and so on are not introduced preferably in some embodiments; PbO and $As_2O_3$ are toxic substances, and thus do not conform to the environmental protection requirements even if a small amount of them is added. Hence, PbO and $As_2O_3$ are not contained in some embodiments of the present invention.

In some embodiments of the present invention, the colorant is added into the raw materials to prepare the colorful glass, the microcrystalline glass or the microcrystalline glass product, so that the glass microcrystalline glass or the microcrystalline glass product can show up in different colors; the colorant contains: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%. The contents in percentage by weight and functions of the colorant thereof are elaborated as follows:

With regard to a brown or green glass, microcrystalline glass or microcrystalline glass product prepared by the present invention, NiO, $Ni_2O_3$ or $Pr_2O_5$ is used as the colorant. NiO and $Ni_2O_3$, as the colorants, are used for preparing the brown or green glass, microcrystalline glass or microcrystalline glass product. Two components can be used separately or in a mixed manner, and the contents thereof are generally no more than 4%, preferably no more than 3% generally. If the content is more than 4%, the colorants cannot be dissolved into the glass, the microcrystalline glass or the microcrystalline glass product well, and the minimum contents thereof are above 0.1% respectively. If the content is lower than 0.1%, the color of the glass, the microcrystalline glass or the microcrystalline glass product is not obvious. In some embodiments, about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%0, 2.3%, 2.4, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% of NiO or $Ni_2O_3$ can be contained. If mixed, the total content of NiO and $Ni_2O_3$ is generally no more than 4%, and the minimum total content thereof is above 0.1%. In some embodiments, about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% of NiO and $Ni_2O_3$ can be contained. When $Pr_2O_5$ is used as a colorant for the green glass, microcrystalline glass or microcrystalline glass product, separately, the content thereof is no more than 8% generally, preferably no more than 6%. The minimum content thereof is above 0.4%, the color thereof is not obvious if the content is lower than 0.4%. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8% or 8.0% of $Pr_2O_5$ can be contained.

CoO or $Co_2O_3$ is used as a colorant for a blue glass, microcrystalline glass or microcrystalline glass product prepared by the present invention. The two colorant components can be used separately or in a mixed manner, and the contents thereof are generally no more than 2% respectively, preferably no more than 1.8%. If the content of each one is more than 2%, the colorant cannot be dissolved into the glass, microcrystalline glass or microcrystalline glass product well. The minimum content of each one is above 0.05%. If lower than 0.05%, the color of the glass, microcrystalline glass or microcrystalline glass product is not obvious. In some embodiments, about 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0% of CoO or $Co_2O_3$ can be contained. If mixed, the total content of CoO and $Co_2O_3$ is no more than 2%, and the minimum total content is above 0.05%. In some embodiments, about 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, and 2.0% of CoO or $Co_2O_3$ can be contained.

$Cu_2O$ or $CeO_2$ is used as a colorant for a yellow glass, microcrystalline glass or microcrystalline glass product prepared by the present invention. The two colorant components can be used separately or in a mixed manner, and the minimum contents thereof are above 0.5 respectively. If the content of each one is lower than 0.5%, the color of the glass, microcrystalline glass or microcrystalline glass product is not obvious. $Cu_2O$ is used no more than 4% separately, preferably no more than 3%. If the content is more than 4%, the glass is easily devitrified. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% of $Cu_2O$ can be contained. The $CeO_2$ content is generally no more than 4% separately, preferably no more than 3%. If the content is more than 4%, the gloss of the glass, microcrystalline glass or microcrystalline glass product prepared by the present invention is poor. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% of $CeO_2$ can be contained. Meanwhile, a small amount of $CeO_2$ added into the glass has the effect of defoaming, and $CeO_2$ can be used as the clarifiant in the glass as well. If the two colorants are used in a mixed manner, the total amount thereof is generally no more than 4%, and the minimum content thereof is above 0.5%. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% of $CeO_2$ and $Cu_2O$ can be contained.

For a black or smoky gray glass, microcrystalline glass or microcrystalline glass product prepared by the present invention, $Fe_2O_3$ is used as the colorant separately; or $Fe_2O_3$ and CoO are mixed as the colorant; or $Fe_2O_3$ and $Co_2O_3$ are mixed as the colorant; or $Fe_2O_3$, CoO and NiO are mixed as the colorant; or $Fe_2O_3$, $Co_2O_3$ and NiO are mixed as the colorant. For preparing the black and smoky gray glasses, microcrystalline glasses or microcrystalline glass products, $Fe_2O_3$ is mainly used for coloring, with the content no more than 7%, preferably no more than 5%, and the minimum content thereof is above 0.2%. In some embodiments, about 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.5%, 5.0%, 5.5%, 6.0%, 6.5% or 7.0% of $Fe_2O_3$ can be contained. CoO and $Co_2O_3$ can absorb the visible light to deepen the blackness of the glass, microcrystalline glass and microcrystalline glass product. When mixed with $Fe_2O_3$, the contents thereof are no more than 0.3% respectively, and the minimum total content is above 0.2%. In some embodiments, about 0.2%, 0.3%, 0.4%, 0.5% or 0.6% of CoO and $Co_2O_3$ can be contained. NiO can absorb the visible light to deepen the blackness of the glass, microcrystalline glass and microcrystalline glass product. When mixed, the content thereof is generally no more than 1%, and the minimum total content is above 0.2%. In some embodiments, about 0.2%, 0.3%, 0.4%, 0.5%, 0.6%, 0.7%, 0.8%, 0.9% or 1.0% of NiO can be contained.

For a purple glass, microcrystalline glass or microcrystalline glass product prepared by the present invention, $MnO_2$ is used as a colorant, the using content of which is generally no more than 4%, preferably below 3%; the minimum content thereof is above 0.1%, if lower than 0.1%, the color of the glass, microcrystalline glass or microcrystalline glass product is not obvious. In some embodiments, about 0.1%, 0.20, 0.3%, 0.4%, 0.5%, 0.6%, 0.7%, 0.8%, 0.9%, 1.0%, 1.1%, 1.2%0, 1.3%, 1.4%, 1.5%, 1.6%, 1.7%, 1.8%, 1.9%, 2.0%, 2.1%, 2.2%, 2.3%, 2.4%, 2.5%, 2.6, 2.7%, 2.8%, 2.9%, 3.0%, 3.1%, 3.2%, 3.3%, 3.4%, 3.5%, 3.6%, 3.7%, 3.8%, 3.9% or 4.0% of $MnO_2$ can be contained.

For a pink glass, microcrystalline glass or microcrystalline glass product prepared by the present invention, $Er_2O_3$ is used as a colorant, the using content of which is generally no more than 8%, preferably below 6%. Due to the fact that a rare earth element $Er_2O_3$ has a low coloration efficiency, the color of the glass, microcrystalline glass or microcrystalline glass product cannot be further deepened when a content thereof is more than 8%, but the cost increases. On account that the minimum content is above 0.4%, the color of the glass, microcrystalline glass or microcrystalline glass product is not obvious if the content is lower than 0.4%. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8% or 8.0% of $Er_2O_3$ can be contained.

For an amaranthine glass, microcrystalline glass or microcrystalline glass product prepared by the present invention, $Nd_2O_3$ is used as a colorant, a using content of which is no more than 8%, preferably below 6%. Due to the fact that a low coloration efficiency of a rare earth element $Nd_2O_3$ is low, the color of the glass, microcrystalline glass or microcrystalline glass product cannot be further deepened when the content thereof is more than 8%, but the cost increases. On account that the minimum content is above 0.4%, the color of the glass, microcrystalline glass or microcrystalline glass product is not obvious if the content is lower than 0.4%. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8% or 8.0% of $Nd_2O_3$ can be contained.

For a red glass, microcrystalline glass or microcrystalline glass product prepared by the present invention, $Er_2O_3$, $Nd_2O_3$ and $MnO_2$ are mixed as a colorant, Er ions in the glass are available for absorbing light of 400-500 nm, Mn ions are mainly are available for absorbing light of 500 nm, and Nd ions are mainly are available for strongly absorbing light of 580 nm. The three substances can be mixed to prepare the red glass, microcrystalline glass or microcrystalline glass product. As$Er_2O_3$ and $Nd_2O_3$ colors the rare earth, the coloring power is weak. A using amount of $Er_2O_3$ is within 6% and a using amount of $Nd_2O_3$ is within 4%, the coloring power of Mn ions are strong. The using amount is in a range of 2%, the minimum total amount of the mixed colorant thereof is above 0.9%.

"Not introduced", "not comprising" and "0%" recorded herein refer to that the compounds, molecules or elements are not intentionally added into the glass, microcrystalline glass or microcrystalline glass product provided by the present invention as raw materials. Raw materials and/or equipment for producing the glass, microcrystalline glass or microcrystalline glass product will have some impurities or components that are not added intentionally, and a small amount or trace amount of them will be present in the final glass composition, microcrystalline glass or microcrystalline glass product, which fall into the protection scope of the patent for invention as well.

In some embodiments of the present invention, main crystal phases in the microcrystalline glass and the microcrystalline glass product mainly include lithium silicate and quartz crystal phase. Lithium silicate includes lithium disilicate ($Li_2Si_2O_5$) and lithium metasilicate ($Li_2SiO_3$). In some embodiments, lithium disilicate and quartz crystal phase and/or petalite are preferably used as main crystal phases. In some embodiments, lithium disilicate and quartz crystal phase are preferably used as the main crystal phases. In some preferred embodiments, lithium disilicate and α-quartz crystal phase are used as the main crystal phases to obtain the excellent properties in the present invention.

An excellent mechanical property can be provided for the microcrystalline glass provided by the present invention, and meanwhile, the additional mechanical strength can be obtained by ion exchange. Through reasonable component design provided by the present invention, proper grains size can be obtained for the microcrystalline glass and the microcrystalline glass product provided by the present invention. Meanwhile, the microcrystalline glass and the microcrystalline glass product in the present invention have a good crystallinity, so that the microcrystalline glass and the microcrystalline glass product provided by the present invention have an excellent mechanical property. The crystallinity as referred to herein refers to the crystallization integrity, wherein mass points in the complete crystals are arranged rather regularly, diffracted rays are strong, sharp and symmetrical, and a full width at half maximum of the diffraction peak is approximate to an instrumented width; crystals with poor crystallinity have a disclosure defect and so on, so that a diffraction line peak shape is wide but dispersive. The poorer the crystallinity, the weaker the diffraction capability, the wider the diffraction peak till it disappears in the background.

The grain size and haze of the microcrystalline glass or the microcrystalline glass product provided by the present invention will affect the transparency thereof, namely the light transmittance. The smaller the grains, the higher the transparency; the lower the haze, the higher the transparency. In some embodiments, the haze for a thickness of 0.55 mm is below 0.6%, preferably below 0.5%, more preferably below 0.4%. In some embodiments, a grain size is below 100 nm, preferably below 80 nm, more preferably below 60 nm, further preferably below 50 nm, still further preferably below 40 nm. On the other aspect, it is found through the studies that the smaller a gap between the refractive indexes of the crystal phase and the glass phase in the microcrystalline glass, the higher the transparency of the microcrystalline glass or the microcrystalline glass product.

In some embodiments, the microcrystalline glass or the microcrystalline glass product is high in transparency in a visible light range (that is, the microcrystalline glass or the microcrystalline glass product is transparent). In some embodiments, an average light transmittance of the glass for a thickness of 1 mm at a wavelength of 400-800 nm is above 80%, preferably above 85%, more preferably above 88%. In some preferred embodiments, a light transmittance for a thickness of 0.55 mm at a wavelength of 500 nm is above 80%, preferably above 85%, more preferably above 88%, further preferably above 91%.

In some embodiments, an antimicrobial ingredient can be added into the glass, the microcrystalline glass or the microcrystalline glass product.

The glass composition, the microcrystalline glass and the microcrystalline glass product provided by the present invention can be produced and manufactured by the following methods:

generating the glass composition: homogeneously mixing raw materials by component proportion ranges; placing a homogeneous mixture into a platinum or quartz crucible; melting in an electric furnace or a gas furnace for 5-24 h in a temperature range from 1,250° C. to 1,650° C. based on the melting difficulty of the glass composition; after stirring homogeneously, cooling to a proper temperature and casting to a mould, and finally cooling slowly.

The glass composition provided by the present invention can be formed by a well-known method. In some embodiments, a refractive index (nd) of the glass composition provided by the present invention is 1.500-1.530, preferably 1.510-1.525.

The glass composition provided by the present invention is crystallized through a crystallization technology after formed or formed and processed, and then crystals are separated homogeneously in the glass. The crystallization treatment can be conducted through one stage or two stages, but two stages are preferred. A nucleus formation technology is conducted at a first temperature, and a crystal growth technology is conducted at a second temperature higher than that of the nucleus formation technology. The crystallization treatment conducted at the first temperature is called the first crystallization treatment, and the crystallization treatment conducted at the second temperature is called the second crystallization treatment.

For making the microcrystalline glass have the desired physical properties, the preferred crystallization technology is as follows:

The nucleus formation and crystal growth technologies can be conducted continuously by virtue of the crystallization treatment at one stage. Namely, the microcrystalline glass is kept at the thermal treatment temperature for a certain period of time after raised to the specified crystallization treatment temperature, and then cooled. The crystallization treatment temperature is preferably 490-800° C., more preferably 550-750° C. in an order to separate the desired crystal phase. The holding time is preferably 0-8 h, more preferably 1-6 h at the crystallization treatment temperature.

When the crystallization treatment is conducted through the above two stages, the first temperature is preferably 490-650° C., and the second temperature is preferably 600-850° C. The holding time at the first temperature is preferably 0-24 h, more preferably 2-15 h. The holding time at the second temperature is preferably 0-10 h, more preferably 0.5-6 h.

The above holding time as 0 h refers to that cooling or heating is started after the temperature thereof is reached for less than 1 min.

In some embodiments, a refractive index (nd) of the microcrystalline glass provided by the present invention obtained by the crystallization technology is 1.520-1.550, preferably 1.530-1.545.

In some embodiments, the glass composition or the microcrystalline glass can be manufactured into a forming body through various technologies. The forming body includes but not limited to sheets. The technology includes but not limited to slit drawing process, float process, rolling process and other well-known sheet forming technologies in the art. Or, the glass composition or the microcrystalline glass can be formed by the well-known float process or rolling process in the art.

The glass composition or the microcrystalline glass provided by the present invention can be manufactured into a sheet glass forming body by processing method such as grinding or polishing, but the method for manufacturing the glass forming body is not limited to these methods.

The glass or microcrystalline glass forming body provided by the present invention can be prepared into various shapes by virtue of a hot bending or pressing method, but is not limited to these methods.

The glass composition, the microcrystalline glass and the microcrystalline glass product provided by the present invention can have any reasonable and useful thickness.

For the microcrystalline glass of the present invention, high strength can be obtained by the formation of a compressive stress layer, in addition to separating the crystals to improve the mechanical property, thereby preparing the microcrystalline glass product.

In some embodiments, the glass composition or the microcrystalline glass can be processed into sheets, and/or molded (such as punching, hot bending), polished and/or optically scanned after shaped, and then chemically tempered through a chemical tempering technology.

Chemical tempering provided by the present invention is an ion exchange method. The glass or the microcrystalline glass provided by the present invention can be subject to ion exchange by the well-known method in the art. During the ion exchange, small metal ions in the glass or the microcrystalline glass are replaced or "exchanged" by big metal ions, having the same valent state, near the glass or the microcrystalline glass. Small ions are replaced by big ions, and compressive stress is built in the glass or the microcrystalline glass, so as to form a compressive stress layer.

In some embodiments, the metal ions are monovalent alkali metal ions (for instance, $Na^+$, $K^+$, $Rb^+$ and $Cs^+$); ion exchange is conducted by immersing the glass or the microcrystalline glass into a salt bath of at least one molten salt containing big metal ions, and the big metal ions are used for replacing small metal ions in the glass. Or, other monovalent alkali metal ions, such as $Ag^+$, $Tl^+$ and $Cu^+$, can be used for exchanging monovalent ions. One or more ion exchange processes for chemically tempering the glass or the microcrystalline glass can include but not limited to: immersing it into single salt bath, or immersing it into a plurality of salt baths with same or different components, and wherein a washing and/or annealing step is provided between immersing.

In some embodiments, ion exchange can be conducted by immersing the glass or the microcrystalline glass into a salt bath of a molten Na salt (such as $NaNO_3$) at a temperature of 430° C.-470° C. for about 6-20 h, wherein the preferred temperature ranges from 435° C. to 460° C., and the preferred time ranges from 8 to 13 h. In such embodiment, Na ion is replaced as a part of Li ions in the glass or the microcrystalline glass, so that a surface compression layer is formed and a high mechanical property is presented. In some embodiments, ion exchange can be conducted by immersing the glass or the microcrystalline glass into a salt bath of a molten K salt (such as $KNO_3$) at a temperature of about 400° C.-450° C. for 1-8 h, wherein the preferred time ranges from 2 to 4 h.

In some preferred embodiments, through the salt bath of the molten Na salt (such as $NaNO_3$) at 450° C. for about 8 h, a depth of an ion exchange layer reaches above 80 μm, preferably above 85 sm.

In some embodiments, there is an ion implantation method capable of injecting ions into a glass or microcrystalline glass surface layer, and a hot tempering method capable of heating the glass or the microcrystalline glass, and then rapidly cooling.

Various property indexes of the glass composition, the microcrystalline glass and/or the microcrystalline glass product provided by the present invention are tested by the following methods:

[Thermal Expansion Coefficient]
Thermal expansion coefficient ($\alpha_{20° C.-120° C.}$) is tested as per the test method in GB/T7962.16-2010.

[Refractive Index]
Refractive index (nd) is tested as per the method in GB/T7962.1-2010.

[Haze]
A haze tester EEL57D is used for testing a glass sample with the thickness of 0.55 mm as per GB2410-80.

[Grain Size]
Use a scanning electron microscope (SEM) for determination, conduct surface treatment for the microcrystalline glass in an HF acid, conduct metal spraying for a microcrystalline glass surface, and conduct surface scanning under the SEM to determine the grain sizes thereof.

[Light Transmittance]
Process the sample into 1 mm thick, polish relative faces in parallel, and use Hitachi U-41000 spectrophotometer to determine the average light transmittance of 400-800 nm.

Process a sample into 0.55 mm thick, polish relative faces in parallel, and use Hitachi U-41000 spectrophotometer to determine the light transmittance of 550 nm.

[Thermal Refractive Index Coefficient]
The thermal refractive index coefficient at 20-40° C. is tested as per the method specified in GB/T 7962.4-2010.

[Crystallinity]
Compare an XRD diffraction peak with a database map, obtain the crystallinity by calculating the proportion of the crystal phase diffraction intensity in the entire map strength, and internally calibrate a pure quartz crystal.

[Surface Stress] and [Depth of Ion Exchange Layer]

The surface stress is determined by a glass surface stress gauge FSM-6000LEUV

The depth of the ion exchange layer is determined by a glass surface stress gauge SLP-2000.

As the determination conditions, calculation is conducted based on a refractive index of the sample as 1.54 and an optical elastic constant as 25.3[(nm/cm)/Mpa].

[Falling Ball Test Height]

After a 150×57×0.55 mm sample, the two surfaces of which are polished, is placed on a rubber sheet, the sample cannot break but can bear the maximum falling ball test height if a 132 g steel ball falls from a prescribed height. To be specific, the test is conducted when the falling ball test height is 650 mm. The height is changed as 700 mm, 750 mm, 800 mm, 850 mm or 900 mm or higher in sequence without breaking. For the embodiment having the "falling ball test height", the microcrystalline glass product is used as a test object. The test data recorded as 900 mm in the embodiments indicates that the microcrystalline glass product bears the impact without breaking even if the steel ball falls from a height of 900 mm.

[Fracture Toughness]

By applying a method of directly measuring indentation extension and crack size, a specimen, with the specification of 2 mm×4 mm×20 mm, is prepared by chamfering, grinding and polishing. After preparation, a Vickers hardness indenter is used for adding 49N force and then maintaining for 30 s, and a breaking strength thereof is determined by a three-point bending method after indentations are punched.

[Four-Point Bending Strength]

A glass, with a specification of 150×57×0.55 mm, is tested by a microcomputer control electronic universal testing machine CMT6502 as per ASTM C 158-2002.

The glass composition provided by the present invention has the following properties:

1) In some embodiments, the thermal expansion coefficient ($\alpha_{20°\,C.\text{-}120°\,C.}$) is $45\times10^{-7}$/K-$70\times10^{-7}$/K, preferably $50\times10^{-7}$/K-$70\times10^{-7}$/K.

2) In some embodiments, the refractive index (nd) is 1.500-1.530, preferably 1.510-1.525.

The microcrystalline glass provided by the present invention has the following properties:

1) In some embodiments, the haze at the thickness of 0.55 mm is below 0.6%, preferably below 0.5%, more preferably below 0.4%.

2) In some embodiments, the grain size is below 100 nm, preferably below 80 nm, more preferably below 60 nm, further preferably below 50 nm, still further preferably below 40 nm.

3) In some embodiments, the thermal refractive index coefficient of the microcrystalline glass provided by the present invention is below $-0.5\times10^{-6}$/° C., preferably below $-0.8\times10^{-6}$/° C., more preferably below $-1.1\times10^{-6}$/° C.

4) In some embodiments, the crystallinity is above 50%, preferably above 65%, more preferably above 70%, further preferably above 75%.

5) In some embodiments, the refractive index (nd) is 1.520-1.550, preferably 1.530-1.545.

6) In some embodiments, the average light transmittance of the glass for the thickness of 1 mm at a wavelength of 400-800 nm is above 80%, preferably above 85%, more preferably above 88%.

7) In some embodiments, the light transmittance for the thickness of 0.55 mm at a wavelength of 550 nm is above 80%, preferably above 85%, more preferably above 88%, further preferably above 91%.

The microcrystalline glass product provided by the present invention, except the properties of the above microcrystalline glass, has the following properties:

1) In some embodiments, the surface stress is above 200 MPa, preferably above 250 MPa, more preferably above 300 MPa;

2) In some embodiments, the four-point bending strength is above 600 MPa, preferably above 650 MPa, more preferably above 700 MPa;

3) In some embodiments, the depth of the ion exchange layer is above 30 μm, preferably above 50 μm, more preferably above 60 μm, further preferably above 80 μm.

4) In some embodiments, the falling ball test height is above 700 mm, preferably above 800 mm, more preferably above 1,000 mm, further preferably above 1,200 mm;

5) In some embodiments, the fracture toughness is above 1 MPa·m$^{1/2}$, preferably above 1.3 MPa·m$^{1/2}$, more preferably above 1.5 MPa·m$^{1/2}$.

6) In some embodiments, the average light transmittance of the glass for the thickness of 1 mm at a wavelength of 400-800 nm is above 80%, preferably above 85%, more preferably above 88%.

7) In some embodiments, the light transmittance for the thickness of 0.55 mm at a wavelength of 550 nm is above 80%, preferably above 85%, more preferably above 88%, further preferably above 91%.

The microcrystalline glass and the microcrystalline glass product provided by the present invention, due to having the excellent property, can be extensively manufactured into a glass cover plate or a glass component; and meanwhile, the microcrystalline glass, the microcrystalline glass product, and the prepared glass cover plate or the glass component provided by the present invention can be applied to electronic devices or display devices, such as mobile phone, watch, computer, and touch display screen.

Embodiment

For the purpose of further clearly explaining and illustrating the technical solution of the present invention, the following non-restrictive embodiments will be provided. According to the embodiments of the present invention, many efforts have been made to ensure the accuracy of numerical values (such as quantity, temperature), but some errors and deviations must be considered. The composition is given by wt % based on oxides, and is standardized as 100%.

Tables 1-3 below show the embodiments of the glass composition.

TABLE 1

| Components (wt %) | 1 | 2 | 3 | 4 | 5 | 6 | 7 | 8 |
| --- | --- | --- | --- | --- | --- | --- | --- | --- |
| SiO$_2$ | 75.5 | 75.5 | 75.3 | 74.6 | 74.2 | 79.0 | 78.5 | 76.5 |
| Al$_2$O$_3$ | 8.5 | 7.6 | 8.5 | 9.5 | 9.8 | 7.0 | 8.0 | 8.0 |
| Li$_2$O | 9.5 | 9.6 | 10.0 | 9.5 | 9.3 | 9.0 | 8.0 | 10.0 |
| K$_2$O | 1.0 | 1.0 | 0.5 | 1.0 | 1.0 | 0.8 | 1.0 | 0.6 |
| ZnO | 0.7 | 0.5 | 0.5 | 1.0 | 0.6 | 0.0 | 0.4 | 0.5 |

TABLE 1-continued

| Components (wt %) | 1 | 2 | 3 | 4 | 5 | 6 | 7 | 8 |
|---|---|---|---|---|---|---|---|---|
| MgO | 1.0 | 1.0 | 1.0 | 0.9 | 1.0 | 1.0 | 1.0 | 1.0 |
| $P_2O_5$ | 1.8 | 1.9 | 2.0 | 1.5 | 1.7 | 1.2 | 1.1 | 1.4 |
| $ZrO_2$ | 2.0 | 2.4 | 2.2 | 2.0 | 2.0 | 2.0 | 2.0 | 2.0 |
| $Sb_2O_3$ | 0.0 | 0.5 | 0.0 | 0.0 | 0.3 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Na_2O$ | 0.0 | 0.0 | 0.0 | 0.0 | 0.1 | 0.0 | 0.0 | 0.0 |
| $B_2O_3$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| $(SiO_2 + Li_2O)/Al_2O_3$ | 10.00 | 11.20 | 10.04 | 8.85 | 8.52 | 12.57 | 10.81 | 10.81 |
| $(SiO_2 + Li_2O)/P_2O_5$ | 47.22 | 44.79 | 42.65 | 56.07 | 49.12 | 73.33 | 78.64 | 61.79 |
| $(Al_2O_3 + Li_2O)/P_2O_5$ | 10.00 | 9.05 | 9.25 | 12.67 | 11.24 | 13.33 | 14.55 | 12.86 |
| $(SiO_2 + Al_2O_3 + Li_2O + ZrO_2)/P_2O_5$ | 53.06 | 50.05 | 48.00 | 63.73 | 56.06 | 80.83 | 87.73 | 68.93 |
| $(MgO + K_2O)/ZrO_2$ | 1.00 | 0.83 | 0.68 | 0.95 | 1.00 | 0.90 | 1.00 | 0.80 |
| $Li_2O/(K_2O + ZrO_2)$ | 3.17 | 2.82 | 3.70 | 3.17 | 3.10 | 3.21 | 2.67 | 3.85 |
| Thermal expansion coefficient $\alpha_{20°C.-120°C.}$ (×$10^{-7}$/K) | 64 | 62 | 58 | 65 | 64 | 57 | 55 | 59 |
| Refractive index nd | 1.5215 | 1.5206 | 1.5159 | 1.5233 | 1.5219 | 1.5189 | 1.5142 | 1.5177 |

TABLE 2

| Components (wt %) | 9 | 10 | 11 | 12 | 13 | 14 | 15 | 16 |
|---|---|---|---|---|---|---|---|---|
| $SiO_2$ | 72.0 | 71.9 | 73.0 | 73.5 | 76.0 | 74.0 | 74.5 | 74.5 |
| $Al_2O_3$ | 9.5 | 9.0 | 8.0 | 7.8 | 6.9 | 7.9 | 7.8 | 9.5 |
| $Li_2O$ | 10.0 | 10.0 | 9.9 | 10.0 | 9.6 | 10.0 | 9.7 | 9.0 |
| $K_2O$ | 0.5 | 1.0 | 1.0 | 1.0 | 1.0 | 0.6 | 1.1 | 0.9 |
| ZnO | 1.0 | 2.5 | 2.3 | 2.3 | 0.8 | 1.2 | 1.3 | 0.9 |
| MgO | 2.0 | 1.0 | 1.5 | 1.0 | 1.0 | 1.5 | 1.0 | 1.0 |
| $P_2O_5$ | 1.8 | 1.9 | 1.8 | 1.9 | 2.0 | 2.0 | 1.9 | 1.8 |
| $ZrO_2$ | 3.0 | 2.2 | 2.5 | 2.2 | 2.2 | 2.5 | 2.2 | 2.2 |
| $Sb_2O_3$ | 0.2 | 0.0 | 0.0 | 0.3 | 0.5 | 0.3 | 0.3 | 0.2 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| $Na_2O$ | 0.0 | 0.5 | 0.0 | 0.0 | 0.0 | 0.0 | 0.0 | 0.0 |
| $B_2O_3$ | 0.0 | 0.0 | 0.0 | 0.0 | 0.0 | 0.0 | 0.2 | 0.0 |
| $(SiO_2 + Li_2O)/Al_2O_3$ | 8.63 | 9.10 | 10.36 | 10.71 | 12.41 | 10.63 | 10.79 | 8.79 |
| $(SiO_2 + Li_2O)/P_2O_5$ | 45.56 | 43.11 | 46.06 | 43.95 | 42.80 | 42.00 | 44.32 | 46.39 |
| $(Al_2O_3 + Li_2O)/P_2O_5$ | 10.83 | 10.00 | 9.94 | 9.37 | 8.25 | 8.95 | 9.21 | 10.28 |
| $(SiO_2 + Al_2O_3 + Li_2O + ZrO_2)/P_2O_5$ | 52.50 | 49.00 | 51.89 | 49.21 | 47.35 | 47.20 | 49.58 | 52.89 |
| $(MgO + K_2O)/ZrO_2$ | 0.83 | 0.91 | 1.00 | 0.91 | 0.91 | 0.84 | 0.95 | 0.86 |
| $Li_2O/(K_2O + ZrO_2)$ | 2.86 | 3.13 | 2.83 | 3.13 | 3.00 | 3.23 | 2.94 | 2.90 |
| Thermal expansion coefficient $\alpha_{20°C.-120°C.}$ (×$10^{-7}$/K) | 63 | 63 | 64 | 61 | 57 | 59 | 59 | 63 |
| Refractive index nd | 1.5243 | 1.522 | 1.5239 | 1.5211 | 1.5135 | 1.5146 | 1.5232 | 1.524 |

TABLE 3

| Components (wt %) | 17 | 18 | 19 | 20 | 21 | 22 | 23 |
|---|---|---|---|---|---|---|---|
| $SiO_2$ | 74.9 | 72.5 | 72.7 | 75.9 | 75.8 | 75.7 | 75.5 |
| $Al_2O_3$ | 8.5 | 7.5 | 9.5 | 7.0 | 7.3 | 7.5 | 7.8 |
| $Li_2O$ | 10.0 | 12.0 | 9.5 | 9.9 | 9.8 | 9.7 | 9.6 |
| $K_2O$ | 1.0 | 1.5 | 1.0 | 1.0 | 1.0 | 1.0 | 1.0 |
| ZnO | 0.2 | 1.7 | 1.9 | 0.9 | 0.8 | 0.8 | 0.8 |
| MgO | 1.0 | 0.5 | 1.0 | 1.0 | 1.0 | 1.0 | 1.0 |
| $P_2O_5$ | 2.0 | 1.9 | 1.9 | 1.9 | 1.9 | 1.9 | 1.9 |
| $ZrO_2$ | 2.2 | 2.2 | 2.0 | 2.2 | 2.2 | 2.2 | 2.2 |
| $Sb_2O_3$ | 0.2 | 0.2 | 0.5 | 0.2 | 0.2 | 0.2 | 0.2 |
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 |
| $B_2O_3$ | 0.0 | 0.0 | 0.0 | 0.0 | 0.0 | 0.0 | 0.0 |
| $(SiO_2 + Li_2O)/Al_2O_3$ | 9.99 | 11.27 | 8.65 | 12.26 | 11.73 | 11.39 | 10.91 |

TABLE 3-continued

| Components (wt %) | 17 | 18 | 19 | 20 | 21 | 22 | 23 |
|---|---|---|---|---|---|---|---|
| $(SiO_2 + Li_2O)/P_2O_5$ | 42.45 | 44.47 | 43.26 | 45.16 | 45.05 | 44.95 | 44.79 |
| $(Al_2O_3 + Li_2O)/P_2O_5$ | 9.2.5 | 10.26 | 10.00 | 8.89 | 9.00 | 9.05 | 9.16 |
| $(SiO_2 + Al_2O_3 + Li_2O + ZrO_2)/P_2O_5$ | 47.80 | 49.58 | 49.32 | 50.00 | 50.05 | 50.05 | 50.05 |
| $(MgO + K_2O)/ZrO_2$ | 0.91 | 0.91 | 1.00 | 0.91 | 0.91 | 0.91 | 0.91 |
| $Li_2O/(K_2O + ZrO_2)$ | 3.13 | 3.24 | 3.17 | 3.09 | 3.06 | 3.03 | 3.00 |
| Thermal expansion coefficient $\alpha_{20°\ C.-120°\ C.}$ ($\times 10^{-7}$/K) | 63 | 62 | 63 | 61 | 64 | 61 | 60 |
| Refractive index nd | 1.5192 | 1.5224 | 1.5233 | 1.5226 | 1.5244 | 1.5213 | 1.5214 |

Tables 4-6 below show the embodiments of microcrystal line glass

TABLE 4

| Components (wt %) | 1 | 2 | 3 | 4 | 5 | 6 | 7 | 8 |
|---|---|---|---|---|---|---|---|---|
| $SiO_2$ | 75.5 | 75.5 | 75.3 | 74.6 | 74.2 | 79.0 | 78.5 | 76.5 |
| $Al_2O_3$ | 8.5 | 7.6 | 8.5 | 9.5 | 9.8 | 7.0 | 8.0 | 8.0 |
| $Li_2O$ | 9.5 | 9.6 | 10.0 | 9.5 | 9.3 | 9.0 | 8.0 | 10.0 |
| $K_2O$ | 1.0 | 1.0 | 0.5 | 1.0 | 1.0 | 0.8 | 1.0 | 0.6 |
| ZnO | 0.7 | 0.5 | 0.5 | 1.0 | 0.6 | 0.0 | 0.4 | 0.5 |
| MgO | 1.0 | 1.0 | 1.0 | 0.9 | 1.0 | 1.0 | 1.0 | 1.0 |
| $P_2O_5$ | 1.8 | 1.9 | 2.0 | 1.5 | 1.7 | 1.2 | 1.1 | 1.4 |
| $ZrO_2$ | 2.0 | 2.4 | 2.2 | 2.0 | 2.0 | 2.0 | 2.0 | 2.0 |
| $Sb_2O_3$ | 0.0 | 0.5 | 0.0 | 0.0 | 0.3 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| $Na_2O$ | 0.0 | 0.0 | 0.0 | 0.0 | 0.1 | 0.0 | 0.0 | 0.0 |
| $B_2O_3$ | 0.0 | 0.0 | 0.0 | 0.0 | 0.0 | 0.0 | 0.0 | 0.0 |
| $(SiO_2 + Li_2O)/Al_2O_3$ | 10.00 | 11.20 | 10.04 | 8.85 | 8.52 | 12.57 | 10.81 | 10.81 |
| $(SiO_2 + Li_2O)/P_2O_5$ | 47.22 | 44.79 | 42.65 | 56.07 | 49.12 | 73.33 | 78.64 | 61.79 |
| $(Al_2O_3 + Li_2O)/P_2O_5$ | 10.00 | 9.05 | 9.25 | 12.67 | 11.24 | 13.33 | 14.55 | 12.86 |
| $(SiO_2 + Al_2O_3 + Li_2O + ZrO_2)/P_2O_5$ | 53.06 | 50.05 | 48.00 | 63.73 | 56.06 | 80.83 | 87.73 | 68.93 |
| $(MgO + K_2O)/ZrO_2$ | 1.00 | 0.83 | 0.68 | 0.95 | 1.00 | 0.90 | 1.00 | 0.80 |
| $Li_2O/(K_2O + ZrO_2)$ | 3.17 | 2.82 | 3.70 | 3.17 | 3.10 | 3.21 | 2.67 | 3.85 |
| Haze for a thickness of 0.55 mm (%) | 0.25 | 0.34 | 0.44 | 0.20 | 0.35 | 0.39 | 0.40 | 0.42 |
| Grain size (nm) | 40 | 40 | 45 | 40 | 40 | 50 | 45 | 45 |
| Thermal refractive index coefficient ($\times 10^{-6}$/° C.) | −1.4 | −1.5 | −0.8 | −1.4 | −1.4 | −1.1 | −0.9 | −0.8 |
| Crystallinity | 0.81 | 0.82 | 0.7 | 0.8 | 0.82 | 0.77 | 0.75 | 0.74 |
| Refractive index nd | 1.5415 | 1.5406 | 1.5359 | 1.5433 | 1.5419 | 1.5389 | 1.5342 | 1.5377 |
| Average light transmittance for a thickness of 1 mm at a wavelength of 400-800 nm | 0.87 | 0.86 | 0.85 | 0.88 | 0.88 | 0.85 | 0.85 | 0.85 |
| Average light transmittance for a thickness of 0.55 mm at a wavelength of 550 nm | 0.92 | 0.91 | 0.88 | 0.92 | 0.92 | 0.88 | 0.9 | 0.89 |
| Main crystal phase | Quartz crystal phase and lithium disilicate | Quartz crystal phase and lithium disilicate | Quartz crystal phase and lithium disilicate | Quartz crystal phase and lithium disilicate | Quartz crystal phase, lithium disilicate and petalite | Quartz crystal phase and lithium disilicate | Quartz crystal phase and lithium disilicate | Quartz crystal phase and lithium disilicate |
| First crystallization temperature and time | 540° C.- 10 h | 560° C.- 10 h | 570° C.- 10 h | 590° C.- 10 h | 580° C.- 6 h | 590° C.- 10 h | 600° C.- 10 h | 590° C.- 10 h |
| Second crystallization temperature and time | 770° C.- 0.5 h | 740° C.- 4 h | 800° C.- 0.5 h | 715° C.- 1 h | 690° C.- 2 h | 710° C.- 6 h | 730° C.- 2 h | 730° C.- 1 h |

TABLE 5

| Components (wt %) | 9 | 10 | 11 | 12 | 13 | 14 | 15 | 16 |
|---|---|---|---|---|---|---|---|---|
| $SiO_2$ | 72.0 | 71.9 | 73.0 | 73.5 | 76.0 | 74.0 | 74.5 | 74.5 |
| $Al_2O_3$ | 9.5 | 9.0 | 8.0 | 7.8 | 6.9 | 7.9 | 7.8 | 9.5 |
| $Li_2O$ | 10.0 | 10.0 | 9.9 | 10.0 | 9.6 | 10.0 | 9.7 | 9.0 |

TABLE 5-continued

| Components (wt %) | 9 | 10 | 11 | 12 | 13 | 14 | 15 | 16 |
|---|---|---|---|---|---|---|---|---|
| K$_2$O | 0.5 | 1.0 | 1.0 | 1.0 | 1.0 | 0.6 | 1.1 | 0.9 |
| ZnO | 1.0 | 2.5 | 2.3 | 2.5 | 0.8 | 1.2 | 1.3 | 0.9 |
| MgO | 2.0 | 1.0 | 1.5 | 1.0 | 1.0 | 1.5 | 1.0 | 1.0 |
| P$_2$O$_5$ | 1.8 | 1.9 | 1.8 | 1.9 | 2.0 | 2.0 | 1.9 | 1.8 |
| ZrO$_2$ | 3.0 | 2.2 | 2.5 | 2.2 | 2.2 | 2.5 | 2.2 | 2.2 |
| Sb$_2$O$_3$ | 0.2 | 0.0 | 0.0 | 0.3 | 0.5 | 0.3 | 0.3 | 0.2 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| TiO$_2$ | 0.0 | 0.0 | 0.0 | 0.0 | 0.0 | 0.0 | 0.0 | 0.0 |
| Y$_2$O$_3$ | 0.0 | 0.0 | 0.0 | 0.0 | 0.0 | 0.0 | 0.0 | 0.0 |
| Na$_2$O | 0.0 | 0.5 | 0.0 | 0.0 | 0.0 | 0.0 | 0.0 | 0.0 |
| B$_2$O$_3$ | 0.0 | 0.0 | 0.0 | 0.0 | 0.0 | 0.0 | 0.2 | 0.0 |
| (SiO$_2$ + Li$_2$O)/Al$_2$O$_3$ | 8.63 | 9.10 | 10.36 | 10.71 | 12.41 | 10.63 | 10.79 | 8.79 |
| (SiO$_2$ + Li$_2$O)/P$_2$O$_5$ | 45.56 | 43.11 | 46.06 | 43.95 | 42.80 | 42.00 | 44.32 | 46.39 |
| (Al$_2$O$_3$ + Li$_2$O)/P$_2$O$_5$ | 10.83 | 10.00 | 9.94 | 9.37 | 8.25 | 8.95 | 9.21 | 10.28 |
| (SiO$_2$ + Al$_2$O$_3$ + Li$_2$O + ZrO$_2$)/P$_2$O$_5$ | 52.50 | 49.00 | 51.89 | 49.21 | 47.35 | 47.20 | 49.58 | 52.89 |
| (MgO + K$_2$O)/ZrO$_2$ | 0.83 | 0.91 | 1.00 | 0.91 | 0.91 | 0.84 | 0.95 | 0.86 |
| Li$_2$O/(K$_2$O + ZrO$_2$) | 2.86 | 3.13 | 2.83 | 3.13 | 3.00 | 3.23 | 2.94 | 2.90 |
| Haze for a thickness of 0.55 mm (%) | 0.35 | 0.36 | 0.24 | 0.35 | 0.38 | 0.38 | 0.39 | 0.26 |
| Grain size (nm) | 40 | 40 | 40 | 40 | 50 | 45 | 45 | 40 |
| Thermal refractive index coefficient (×10$^{-6}$/° C.) | −1.4 | −1.3 | −1.4 | −1.2 | −1.1 | −1.5 | −1.4 | −1.3 |
| Crystallinity | 0.83 | 0.8 | 0.83 | 0.81 | 0.78 | 0.82 | 0.81 | 0.83 |
| Refractive index nd | 1.5443 | 1.542 | 1.5439 | 1.5411 | 1.5335 | 1.5346 | 1.5432 | 1.544 |
| Average light transmittance for a thickness of 1 mm at a wavelength of 400-800 nm | 0.87 | 0.87 | 0.88 | 0.87 | 0.85 | 0.85 | 0.85 | 0.88 |
| Average light transmittance for a thickness of 0.55 mm at a wavelength of 550 nm | 0.92 | 0.9 | 0.92 | 0.9 | 0.89 | 0.9 | 0.89 | 0.92 |
| Main crystal phase | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate |
| First crystallization temperature and time | 510° C.-6 h | 510° C.-4 h | 510° C.-4 h | 550° C.-6 h | 520° C.-8 h | 520° C.-6 h | 520° C.-6 h | 510° C.-4 h |
| Second crystallization temperature and time | 710° C.-6 h | 715° C.-4 h | 740° C.-0.5 h | 710° C.-6 h | 715° C.-4 h | 720° C.-2 h | 720° C.-1 h | 715° C.-4 h |

TABLE 6

| Components (wt %) | 17 | 18 | 19 | 20 | 21 | 22 | 23 |
|---|---|---|---|---|---|---|---|
| SiO$_3$ | 74.9 | 72.5 | 72.7 | 75.9 | 75.8 | 75.7 | 75.5 |
| Al$_2$O$_3$ | 8.5 | 7.5 | 9.5 | 7.0 | 7.3 | 7.5 | 7.8 |
| Li$_2$O | 10.0 | 12.0 | 9.5 | 9.9 | 9.8 | 9.7 | 9.6 |
| K$_2$O | 1.0 | 1.5 | 1.0 | 1.0 | 1.0 | 1.0 | 1.0 |
| ZnO | 0.2 | 1.7 | 1.9 | 0.9 | 0.8 | 0.8 | 0.8 |
| MgO | 1.0 | 0.5 | 1.0 | 1.0 | 1.0 | 1.0 | 1.0 |
| P$_2$O$_5$ | 2.0 | 1.9 | 1.9 | 1.9 | 1.9 | 1.9 | 1.9 |
| ZrO$_2$ | 2.2 | 2.2 | 2.0 | 2.2 | 2.2 | 2.2 | 2.2 |
| Sb$_2$O$_3$ | 0.2 | 0.2 | 0.5 | 0.2 | 0.2 | 0.2 | 0.2 |
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| TiO$_2$ | 0.0 | 0.0 | 0.0 | 0.0 | 0.0 | 0.0 | 0.0 |
| Y$_2$O$_3$ | 0.0 | 0.0 | 0.0 | 0.0 | 0.0 | 0.0 | 0.0 |
| Na$_2$O | 0.0 | 0.0 | 0.0 | 0.0 | 0.0 | 0.0 | 0.0 |
| B$_2$O$_3$ | 0.0 | 0.0 | 0.0 | 0.0 | 0.0 | 0.0 | 0.0 |
| (SiO$_2$ + Li$_2$O)/Al$_2$O$_3$ | 9.99 | 11.27 | 8.65 | 12.26 | 11.73 | 11.39 | 10.91 |
| (SiO$_2$ + Li$_2$O)/P$_2$O$_5$ | 42.45 | 44.47 | 43.26 | 45.16 | 45.05 | 44.95 | 44.79 |
| (Al$_2$O$_3$ + Li$_2$O)/P$_2$O$_5$ | 9.25 | 10.26 | 10.00 | 8.89 | 9.00 | 9.05 | 9.16 |
| (SiO$_2$ + Al$_2$O$_3$ + Li$_2$O + ZrO$_2$)/P$_2$O$_5$ | 47.80 | 49.58 | 49.32 | 50.00 | 50.05 | 50.05 | 50.05 |
| (MgO + K$_2$O)/ZrO$_2$ | 0.91 | 0.91 | 1.00 | 0.91 | 0.91 | 0.91 | 0.91 |
| Li$_2$O/(K$_2$O + ZrO$_2$) | 3.13 | 3.24 | 3.17 | 3.09 | 3.06 | 3.03 | 3.00 |
| Haze for a thickness of 0.55 mm (%) | 0.36 | 0.37 | 0.38 | 0.37 | 0.23 | 0.38 | 0.36 |
| Grain size (nm) | 50 | 45 | 45 | 45 | 40 | 50 | 50 |
| Thermal refractive index coefficient (×10$^{-6}$/° C.) | −1.4 | −1.2 | −1.4 | −1.5 | −1.4 | −1.3 | −1.4 |

TABLE 6-continued

| Components (wt %) | 17 | 18 | 19 | 20 | 21 | 22 | 23 |
|---|---|---|---|---|---|---|---|
| Crystallinity | 0.8 | 0.82 | 0.81 | 0.82 | 0.84 | 0.82 | 0.83 |
| Refractive index nd | 1.5392 | 1.5424 | 1.5433 | 1.5426 | 1.5444 | 1.5413 | 1.5414 |
| Average light transmittance for a thickness of 1 mm at a wavelength of 400-800 nm | 0.85 | 0.85 | 0.85 | 0.85 | 0.9 | 0.85 | 0.85 |
| Average light transmittance for a thickness of 0.55 mm at a wavelength of 550 nm | 0.9 | 0.91 | 0.91 | 0.9 | 0.92 | 0.9 | 0.9 |
| Main crystal phase | Quartz crystal phase, lithium disilicate and petalite | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate |
| First crystallization temperature and time | 510° C.-6 h | 520° C.-6 h | 560° C.-6 h | 520° C.-2 h | 510° C.-6 h | 520° C.-4 h | 510° C.-6 h |
| Second crystallization temperature and time | 690° C.-2 h | 710° C.-6 h | 715° C.-4 h | 720° C.-2 h | 710° C.-6 h | 715° C.-4 h | 720° C.-2 h |

Tables 7-9 below show the embodiments of microcrystalline glass product

TABLE 7

| Components (wt %) | 1 | 2 | 3 | 4 | 5 | 6 | 7 | 8 |
|---|---|---|---|---|---|---|---|---|
| $SiO_2$ | 75.5 | 75.5 | 75.3 | 74.6 | 74.2 | 79.0 | 78.5 | 76.5 |
| $Al_2O_3$ | 8.5 | 7.6 | 8.5 | 9.5 | 9.8 | 7.0 | 8.0 | 8.0 |
| $Li_2O$ | 9.5 | 9.6 | 10.0 | 9.5 | 9.3 | 9.0 | 8.0 | 10.0 |
| $K_2O$ | 1.0 | 1.0 | 0.5 | 1.0 | 1.0 | 0.8 | 1.0 | 0.6 |
| ZnO | 0.7 | 0.5 | 0.5 | 1.0 | 0.6 | 0.0 | 0.4 | 0.5 |
| MgO | 1.0 | 1.0 | 1.0 | 0.9 | 1.0 | 1.0 | 1.0 | 1.0 |
| $P_2O_5$ | 1.8 | 1.9 | 2.0 | 1.5 | 1.7 | 1.2 | 1.1 | 1.4 |
| $ZrO_2$ | 2.0 | 2.4 | 2.2 | 2.0 | 2.0 | 2.0 | 2.0 | 2.0 |
| $Sb_2O_3$ | 0.0 | 0.5 | 0.0 | 0.0 | 0.3 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| $Na_2O$ | 0.0 | 0.0 | 0.0 | 0.0 | 0.1 | 0.0 | 0.0 | 0.0 |
| $B_2O_3$ | 0.0 | 0.0 | 0.0 | 0.0 | 0.0 | 0.0 | 0.0 | 0.0 |
| $(SiO_2 + Li_2O)/Al_2O_3$ | 10.00 | 11.20 | 10.04 | 8.85 | 8.52 | 12.57 | 10.81 | 10.81 |
| $(SiO_2 + Li_2O)/P_2O_5$ | 47.22 | 44.79 | 42.65 | 56.07 | 49.12 | 73.33 | 78.64 | 61.79 |
| $(Al_2O_3 + Li_2O)/P_2O_5$ | 10.00 | 9.05 | 9.25 | 12.67 | 11.24 | 13.33 | 14.55 | 12.86 |
| $(SiO_2 + Al_2O_3 + Li_2O + ZrO_2)/P_2O_5$ | 53.06 | 50.05 | 48.00 | 63.73 | 56.06 | 80.83 | 87.73 | 68.93 |
| $(MgO + K_2O)/ZrO_2$ | 1.00 | 0.83 | 0.68 | 0.95 | 1.00 | 0.90 | 1.00 | 0.80 |
| $Li_2O/(K_2O + ZrO_2)$ | 3.17 | 2.82 | 3.70 | 3.17 | 3.10 | 3.21 | 2.67 | 3.85 |
| Haze for a thickness of 0.55 mm (%) | 0.25 | 0.34 | 0.44 | 0.20 | 0.35 | 0.39 | 0.4 | 0.42 |
| Grain size (nm) | 40 | 40 | 45 | 40 | 40 | 50 | 45 | 45 |
| Thermal refractive index coefficient ($\times 10^{-6}$/° C.) | −1.4 | −1.5 | −0.8 | −1.4 | −1.4 | −1.1 | −0.9 | −0.8 |
| Crystallinity | 0.81 | 0.82 | 0.7 | 0.8 | 0.82 | 0.77 | 0.75 | 0.74 |
| Refractive index nd | 1.5415 | 1.5406 | 1.5359 | 1.5433 | 1.5419 | 1.5389 | 1.5342 | 1.5377 |
| Average light transmittance for a thickness of 1 mm at a wavelength of 400-800 nm | 0.87 | 0.86 | 0.85 | 0.88 | 0.88 | 0.85 | 0.85 | 0.85 |
| Average light transmittance for a thickness of 0.55 mm at a wavelength of 550 nm | 0.92 | 0.91 | 0.88 | 0.92 | 0.92 | 0.88 | 0.9 | 0.89 |
| Main crystal phase | Quartz crystal phase and lithium disilicate | Quartz crystal phase and lithium disilicate | Quartz crystal phase and lithium disilicate | Quartz crystal phase and lithium disilicate | Quartz crystal phase, lithium disilicate and petalite | Quartz crystal phase and lithium disilicate | Quartz crystal phase and lithium disilicate | Quartz crystal phase and lithium disilicate |

TABLE 7-continued

| Components (wt %) | 1 | 2 | 3 | 4 | 5 | 6 | 7 | 8 |
|---|---|---|---|---|---|---|---|---|
| Surface stress (MPa) | 379 | 380 | 287 | 369 | 363 | 351 | 300 | 298 |
| Four-point bending strength (MPa) | 750 | 752 | 685 | 739 | 742 | 701 | 698 | 677 |
| Depth of ion exchange layer (μm) | 94 | 85 | 75 | 88 | 90 | 80 | 78 | 79 |
| Ball falling height (mm) | 1450 | 1400 | 1150 | 1250 | 1400 | 1250 | 1200 | 1200 |
| Fracture toughness (MPa·m$^{1/2}$) | 2.1 | 2 | 1.3 | 1.7 | 1.6 | 1.5 | 1.2 | 1.3 |

TABLE 8

| Components (wt %) | 9 | 10 | 11 | 12 | 13 | 14 | 15 | 16 |
|---|---|---|---|---|---|---|---|---|
| $SiO_2$ | 72.0 | 71.9 | 73.0 | 73.5 | 76.0 | 74.0 | 74.5 | 74.5 |
| $Al_2O_3$ | 9.5 | 9.0 | 8.0 | 7.8 | 6.9 | 7.9 | 7.8 | 9.5 |
| $Li_2O$ | 10.0 | 10.0 | 9.9 | 10.0 | 9.6 | 10.0 | 9.7 | 9.0 |
| $K_2O$ | 0.5 | 1.0 | 1.0 | 1.0 | 1.0 | 0.6 | 1.1 | 0.9 |
| ZnO | 1.0 | 2.5 | 2.3 | 2.3 | 0.8 | 1.2 | 1.3 | 0.9 |
| MgO | 2.0 | 1.0 | 1.5 | 1.0 | 1.0 | 1.5 | 1.0 | 1.0 |
| $P_2O_5$ | 1.8 | 1.9 | 1.8 | 1.9 | 2.0 | 2.0 | 1.9 | 1.8 |
| $ZrO_2$ | 3.0 | 2.2 | 2.5 | 2.2 | 2.2 | 2.5 | 2.2 | 2.2 |
| $Sb_2O_3$ | 0.2 | 0.0 | 0.0 | 0.3 | 0.5 | 0.3 | 0.3 | 0.2 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_3$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| $Na_2O$ | 0.0 | 0.5 | 0.0 | 0.0 | 0.0 | 0.0 | 0.0 | 0.0 |
| $B_2O_3$ | 0.0 | 0.0 | 0.0 | 0.0 | 0.0 | 0.0 | 0.2 | 0.0 |
| $(SiO_2 + Li_2O)/Al_2O_3$ | 8.63 | 9.10 | 10.36 | 10.71 | 12.41 | 10.63 | 10.79 | 8.79 |
| $(SiO_2 + Li_2O)/P_2O_5$ | 45.56 | 43.11 | 46.06 | 43.95 | 42.80 | 42.00 | 44.32 | 46.39 |
| $(Al_2O_3 + Li_2O)/P_2O_5$ | 10.83 | 10.00 | 9.94 | 9.37 | 8.25 | 8.95 | 9.21 | 10.28 |
| $(SiO_2 + Al_2O_3 + Li_2O + ZrO_2)/P_2O_5$ | 52.50 | 49.00 | 51.89 | 49.21 | 47.35 | 47.20 | 49.58 | 52.89 |
| $(MgO + K_2O)/ZrO_2$ | 0.83 | 0.91 | 1.00 | 0.91 | 0.91 | 0.84 | 0.95 | 0.86 |
| $Li_2O/(K_2O + ZrO_2)$ | 2.86 | 3.13 | 2.83 | 3.13 | 3.00 | 3.23 | 2.94 | 2.90 |
| Haze for a thickness of 0.55 mm (%) | 0.35 | 0.36 | 0.24 | 0.35 | 0.38 | 0.38 | 0.39 | 0.26 |
| Grain size (nm) | 40 | 40 | 40 | 40 | 50 | 45 | 45 | 40 |
| Thermal refractive index coefficient (×10$^{-6}$/° C.) | −1.4 | −1.3 | −1.4 | −1.2 | −1.1 | −1.5 | −1.4 | −1.3 |
| Crystallinity | 0.83 | 0.8 | 0.83 | 0.81 | 0.78 | 0.82 | 0.81 | 0.83 |
| Refractive index nd | 1.5443 | 1.542 | 1.5439 | 1.5411 | 1.5335 | 1.5346 | 1.5432 | 1.544 |
| Average light transmittance for a thickness of 1 mm at a wavelength of 400-800 nm | 0.87 | 0.87 | 0.88 | 0.87 | 0.85 | 0.85 | 0.85 | 0.88 |
| Average light transmittance for a thickness of 0.55 mm at a wavelength of 550 nm | 0.92 | 0.9 | 0.92 | 0.9 | 0.89 | 0.9 | 0.89 | 0.92 |
| Main crystal phase | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate |
| Surface stress (MPa) | 378 | 372 | 374 | 355 | 358 | 360 | 359 | 375 |
| Four-point bending strength (MPa) | 745 | 742 | 746 | 725 | 726 | 728 | 730 | 735 |
| Depth of ion exchange layer (μm) | 85 | 86 | 92 | 92 | 85 | 81 | 82 | 93 |
| Ball falling height (mm) | 1300 | 1300 | 1350 | 1350 | 1300 | 1350 | 1500 | 1550 |
| Fracture toughness (MPa·m$^{1/2}$) | 2 | 2.1 | 2 | 1.9 | 1.7 | 1.9 | 1.8 | 1.6 |

TABLE 9

| Components (wt %) | 17 | 18 | 19 | 20 | 21 | 22 | 23 |
|---|---|---|---|---|---|---|---|
| $SiO_2$ | 74.9 | 72.5 | 72.7 | 75.9 | 75.8 | 75.7 | 75.5 |
| $Al_2O_3$ | 8.5 | 7.5 | 9.5 | 7.0 | 7.3 | 7.5 | 7.8 |

TABLE 9-continued

| Components (wt %) | 17 | 18 | 19 | 20 | 21 | 22 | 23 |
|---|---|---|---|---|---|---|---|
| $Li_2O$ | 10.0 | 12.0 | 9.5 | 9.9 | 9.8 | 9.7 | 9.6 |
| $K_2O$ | 1.0 | 1.5 | 1.0 | 1.0 | 1.0 | 1.0 | 1.0 |
| ZnO | 0.2 | 1.7 | 1.9 | 0.9 | 0.8 | 0.8 | 0.8 |
| MgO | 1.0 | 0.5 | 1.0 | 1.0 | 1.0 | 1.0 | 1.0 |
| $P_2O_5$ | 2.0 | 1.9 | 1.9 | 1.9 | 1.9 | 1.9 | 1.9 |
| $ZrO_2$ | 2.2 | 2.2 | 2.0 | 2.2 | 2.2 | 2.2 | 2.2 |
| $Sb_2O_3$ | 0.2 | 0.2 | 0.5 | 0.2 | 0.2 | 0.2 | 0.2 |
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 |
| $B_2O_3$ | 0.0 | 0.0 | 0.0 | 0.0 | 0.0 | 0.0 | 0.0 |
| $(SiO_2 + Li_2O)/Al_2O_3$ | 9.99 | 11.27 | 8.65 | 12.26 | 11.73 | 11.39 | 10.91 |
| $(SiO_2 + Li_2O)/P_2O_5$ | 42.45 | 44.47 | 43.26 | 45.16 | 45.05 | 44.95 | 44.79 |
| $(Al_2O_3 + Li_2O)/P_2O_5$ | 9.25 | 10.26 | 10.00 | 8.89 | 9.00 | 9.05 | 9.16 |
| $(SiO_2 + Al_2O_3 + Li_2O + ZrO_2)/P_2O_5$ | 47.80 | 49.58 | 49.32 | 50.00 | 50.05 | 50.05 | 50.05 |
| $(MgO + K_2O)/ZrO_2$ | 0.91 | 0.91 | 1.00 | 0.91 | 0.91 | 0.91 | 0.91 |
| $Li_2O/(K_2O + ZrO_2)$ | 3.13 | 3.24 | 3.17 | 3.09 | 3.06 | 3.03 | 3.00 |
| Haze for a thickness of 0.55 mm (%) | 0.36 | 0.37 | 0.38 | 0.37 | 0.23 | 0.38 | 0.36 |
| Grain size (nm) | 50 | 45 | 45 | 45 | 40 | 50 | 50 |
| Thermal refractive index coefficient ($\times 10^{-6}$/° C.) | −1.4 | −1.2 | −1.4 | −1.5 | −1.4 | −1.3 | −1.4 |
| Crystallinity | 0.8 | 0.82 | 0.81 | 0.82 | 0.84 | 0.82 | 0.83 |
| Refractive index nd | 1.5392 | 1.5424 | 1.5433 | 1.5426 | 1.5444 | 1.5413 | 1.5414 |
| Average light transmittance for a thickness of 1 mm at a wavelength of 400-800 nm | 0.85 | 0.85 | 0.85 | 0.85 | 0.89 | 0.85 | 0.85 |
| Average light transmittance for a thickness of 0.55 mm at a wavelength of 550 nm | 0.9 | 0.91 | 0.91 | 0.9 | 0.92 | 0.9 | 0.9 |
| Main crystal phase | Quartz crystal phase, lithium disilicate and petalite | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate | Quartz crystal phase and lithium disilicate |
| Surface stress (MPa) | 355 | 370 | 373 | 363 | 364 | 368 | 367 |
| Four-point bending strength (MPa) | 731 | 739 | 738 | 728 | 724 | 721 | 720 |
| Depth of ion exchange layer (μm) | 89 | 89 | 89 | 89 | 95 | 88 | 86 |
| Ball falling height (mm) | 1300 | 1200 | 1500 | 1300 | 1500 | 1450 | 1500 |
| Fracture toughness ($MPa \cdot m^{1/2}$) | 1.9 | 2.1 | 1.8 | 1.9 | 1.6 | 1.7 | 1.6 |

Tables 10-12 below show the embodiments of colorful microcrystalline glass product

TABLE 10

| Components (wt %) | 1 | 2 | 3 | 4 | 5 | 6 | 7 | 8 |
|---|---|---|---|---|---|---|---|---|
| $SiO_2$ | 66.0 | 75.3 | 72.0 | 71.9 | 73.0 | 73.5 | 72.5 | 72.7 |
| $Al_2O_3$ | 10.0 | 8.5 | 9.5 | 9.0 | 8.0 | 7.8 | 7.5 | 9.5 |
| $Li_2O$ | 14.0 | 10.0 | 10.0 | 10.0 | 9.9 | 10.0 | 12.0 | 9.5 |
| $K_2O$ | 3.1 | 0.5 | 0.5 | 1.0 | 1.0 | 1.0 | 1.5 | 1.0 |
| ZnO | 0.0 | 0.0 | 0.1 | 0.5 | 0.3 | 0.5 | 1.0 | 0.2 |
| MgO | 0.0 | 1.0 | 2.0 | 1.0 | 1.5 | 1.0 | 0.5 | 1.0 |
| $P_2O_5$ | 1.9 | 2.0 | 1.8 | 1.9 | 1.8 | 1.9 | 1.9 | 1.9 |
| $ZrO_2$ | 3.0 | 2.2 | 3.0 | 2.2 | 2.5 | 2.2 | 2.2 | 2.0 |
| $Sb_2O_3$ | 0.0 | 0.0 | 0.0 | 0.0 | 0.0 | 0.3 | 0.2 | 0.5 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| NiO | 0.0 | 0.5 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $B_2O_3$ | 0.0 | 0.0 | 0.0 | 0.0 | 0.0 | 0.0 | 0.0 | 0.0 |
| $Ni_2O_3$ | 0.0 | 0.0 | 0.0 | 0.0 | 0.0 | 0.0 | 0.0 | 0.0 |
| $Pr_2O_5$ | 0.0 | 0.0 | 1.1 | 0.0 | 0.0 | 0.0 | 0.0 | 0.0 |

TABLE 10-continued

| Components (wt %) | 1 | 2 | 3 | 4 | 5 | 6 | 7 | 8 |
|---|---|---|---|---|---|---|---|---|
| CoO | 0.0 | 0.0 | 0.0 | 0.0 | 0.0 | 0.0 | 0.0 | 0.0 |
| $Co_2O_3$ | 0.0 | 0.0 | 0.0 | 2.5 | 0.0 | 0.0 | 0.0 | 0.0 |
| $Cu_2O$ | 2.0 | 0.0 | 0.0 | 0.0 | 0.0 | 0.0 | 0.0 | 0.0 |
| $Fe_2O_3$ | 0.0 | 0.0 | 0.0 | 0.0 | 0.0 | 1.8 | 0.0 | 0.0 |
| $MnO_2$ | 0.0 | 0.0 | 0.0 | 0.0 | 0.0 | 0.0 | 0.7 | 0.0 |
| $Er_2O_3$ | 0.0 | 0.0 | 0.0 | 0.0 | 0.0 | 0.0 | 0.0 | 1.7 |
| $Nd_2O_3$ | 0.0 | 0.0 | 0.0 | 0.0 | 0.0 | 0.0 | 0.0 | 0.0 |
| $CeO_2$ | 0.0 | 0.0 | 0.0 | 0.0 | 2.0 | 0.0 | 0.0 | 0.0 |
| $(SiO_2 + Li_2O)/Al_2O_3$ | 8.00 | 10.04 | 8.63 | 9.10 | 10.36 | 10.71 | 11.27 | 8.65 |
| $(SiO_2 + Li_2O)/P_2O_5$ | 42.11 | 42.65 | 45.56 | 43.11 | 46.06 | 43.95 | 44.47 | 43.26 |
| $(Al_2O_3 + Li_2O)/P_2O_5$ | 12.63 | 9.25 | 10.83 | 10.00 | 9.94 | 9.37 | 10.26 | 10.00 |
| $(SiO_2 + Al_2O_3 + Li_2O + ZrO_2)/P_2O_5$ | 48.95 | 48.00 | 52.50 | 49.00 | 51.89 | 49.21 | 49.58 | 49.32 |
| $(MgO + K_2O)/ZrO_2$ | 1.03 | 0.68 | 0.83 | 0.91 | 1.00 | 0.91 | 0.91 | 1.00 |
| $Li_2O/(K_2O + ZrO_2)$ | 2.30 | 3.70 | 2.86 | 3.13 | 2.83 | 3.13 | 3.24 | 3.17 |
| Glass color | Yellow | Brown | Green | Blue | Yellow | Black | Purple | Pink |

TABLE 11

| Components (wt %) | 9 | 10 | 11 | 12 | 13 | 14 | 15 | 16 |
|---|---|---|---|---|---|---|---|---|
| $SiO_2$ | 75.9 | 74.0 | 71.0 | 72.4 | 75.0 | 71.0 | 70.0 | 70.0 |
| $Al_2O_3$ | 7.0 | 7.9 | 7.9 | 7.7 | 8.1 | 6.8 | 7.7 | 8.5 |
| $Li_2O$ | 9.9 | 10.0 | 11.0 | 12.5 | 9.5 | 10.0 | 11.0 | 8.5 |
| $K_2O$ | 1.0 | 0.6 | 0.5 | 1.5 | 1.0 | 0.6 | 0.5 | 1.0 |
| ZnO | 0.0 | 0.0 | 3.0 | 0.8 | 0.7 | 3.3 | 0.0 | 3.6 |
| MgO | 1.0 | 1.5 | 2.0 | 0.5 | 1.0 | 2.0 | 2.0 | 0.5 |
| $P_2O_5$ | 1.9 | 2.0 | 1.5 | 1.8 | 1.8 | 1.5 | 1.5 | 1.4 |
| $ZrO_2$ | 2.2 | 2.5 | 3.0 | 2.5 | 2.2 | 3.0 | 3.0 | 2.0 |
| $Sb_2O_3$ | 0.2 | 0.3 | 0.1 | 0.0 | 0.5 | 0.0 | 0.0 | 0.5 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 2.0 |
| $TiO_2$ | 0.0 | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 | 0.0 |
| NiO | 0.0 | 0.0 | 0.1 | 0.0 | 0.0 | 0.0 | 0.0 | 0.0 |
| $Na_2O$ | 0.0 | 0.0 | 0.1 | 0.0 | 0.0 | 0.0 | 0.0 | 0.0 |
| $B_2O_3$ | 0.0 | 0.0 | 0.0 | 0.0 | 0.0 | 1.8 | 0.2 | 0.0 |
| $Ni_2O_3$ | 0.0 | 0.0 | 0.0 | 0.0 | 0.0 | 0.0 | 0.0 | 2.0 |
| $Pr_2O_5$ | 0.0 | 0.0 | 0.0 | 0.0 | 0.0 | 0.0 | 0.0 | 0.0 |
| CoO | 0.0 | 0.0 | 0.0 | 0.3 | 0.0 | 0.0 | 0.1 | 0.0 |
| $Co_2O_3$ | 0.0 | 0.0 | 0.0 | 0.0 | 0.2 | 0.0 | 0.0 | 0.0 |
| $Cu_2O$ | 0.0 | 0.0 | 0.0 | 0.0 | 0.0 | 0.0 | 0.0 | 0.0 |
| $Fe_2O_3$ | 0.0 | 0.0 | 4.8 | 0.0 | 0.0 | 0.0 | 4.0 | 0.0 |
| $MnO_2$ | 0.0 | 0.2 | 0.0 | 0.0 | 0.0 | 0.0 | 0.0 | 0.0 |
| $Er_2O_3$ | 0.0 | 0.4 | 0.0 | 0.0 | 0.0 | 0.0 | 0.0 | 0.0 |
| $Nd_2O_3$ | 0.9 | 0.6 | 0.0 | 0.0 | 0.0 | 0.0 | 0.0 | 0.0 |
| $CeO_2$ | 0.0 | 0.0 | 0.0 | 0.0 | 0.0 | 0.0 | 0.0 | 0.0 |
| $(SiO_2 + Li_2O)/Al_2O_3$ | 12.26 | 10.63 | 10.38 | 11.03 | 10.43 | 11.91 | 10.52 | 9.24 |
| $(SiO_2 + Li_2O)/P_2O_5$ | 45.16 | 42.00 | 54.67 | 47.17 | 46.94 | 54.00 | 54.00 | 56.07 |
| $(Al_2O_3 + Li_2O)/P_2O_5$ | 8.89 | 8.95 | 12,60 | 11.22 | 9.78 | 11.20 | 12.47 | 12.14 |
| $(SiO_2 + Al_2O_3 + Li_2O + ZrO_2)/P_2O_5$ | 50.00 | 47.20 | 61.93 | 52.83 | 52.67 | 60.53 | 61.13 | 63.57 |
| $(MgO + K_2O)/ZrO_2$ | 0.91 | 0.84 | 0.83 | 0.80 | 0.91 | 0.87 | 0.83 | 0.75 |
| $Li_2O/(K_2O + ZrO_2)$ | 3.09 | 3.23 | 3.14 | 3.13 | 2.97 | 2.78 | 3.14 | 2.83 |
| Glass color | Amaranthine | Red | Black | Blue | Blue | Brown | Smoky gray | Green |

TABLE 12

| Components (wt %) | 17 | 18 | 19 | 20 | 21 | 22 | 23 |
|---|---|---|---|---|---|---|---|
| $SiO_2$ | 73.4 | 70.0 | 71.5 | 71.5 | 70.0 | 71.5 | 70.0 |
| $Al_2O_3$ | 7.0 | 7.0 | 7.8 | 7.0 | 6.8 | 8.0 | 7.0 |
| $Li_2O$ | 9.5 | 11.5 | 8.5 | 12.5 | 9.5 | 9.7 | 10.0 |
| $K_2O$ | 0.3 | 0.5 | 0.0 | 1.5 | 0.4 | 1.1 | 0.5 |
| ZnO | 0.0 | 0.7 | 0.0 | 0.1 | 0.1 | 0.0 | 0.0 |
| MgO | 2.0 | 2.0 | 2.0 | 0.8 | 2.0 | 0.7 | 2.0 |
| $P_2O_5$ | 1.8 | 1.8 | 1.6 | 1.8 | 1.7 | 1.8 | 1.5 |
| $ZrO_2$ | 3.0 | 3.0 | 2.6 | 2.7 | 2.5 | 2.2 | 2.9 |
| $Sb_2O_3$ | 0.0 | 0.5 | 0.0 | 0.1 | 0.0 | 0.0 | 0.0 |
| SrO | 0.0 | 0.0 | 0.0 | 0.0 | 0.0 | 0.0 | 0.0 |

TABLE 12-continued

| Components (wt %) | 17 | 18 | 19 | 20 | 21 | 22 | 23 |
|---|---|---|---|---|---|---|---|
| BaO | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 |
| $Y_2O_3$ | 0.0 | 0.0 | 0.0 | 0.0 | 0.0 | 0.0 | 0.0 |
| NiO | 0.0 | 0.0 | 0.0 | 0.0 | 0.5 | 0.0 | 0.0 |
| $Na_2O$ | 0.0 | 0.0 | 0.0 | 0.0 | 0.0 | 0.0 | 0.0 |
| $B_2O_3$ | 0.0 | 0.0 | 0.0 | 0.0 | 0.0 | 0.0 | 0.0 |
| $Ni_2O_3$ | 0.0 | 0.0 | 0.0 | 0.0 | 0.0 | 0.0 | 0.0 |
| $Pr_2O_5$ | 0.0 | 0.0 | 0.0 | 0.0 | 0.0 | 5.0 | 0.0 |
| CoO | 0.0 | 0.0 | 0.0 | 0.0 | 0.0 | 0.0 | 0.0 |
| $Co_2O_3$ | 0.0 | 0.0 | 0.0 | 0.0 | 0.0 | 0.0 | 0.0 |
| $Cu_2O$ | 3.0 | 0.0 | 0.0 | 0.0 | 0.0 | 0.0 | 0.0 |
| $Fe_2O_3$ | 0.0 | 0.0 | 0.0 | 0.0 | 0.0 | 0.0 | 0.0 |
| $MnO_2$ | 0.0 | 0.0 | 0.0 | 2.0 | 0.0 | 0.0 | 0.8 |
| $Er_2O_3$ | 0.0 | 0.0 | 0.0 | 0.0 | 6.5 | 0.0 | 3.8 |
| $Nd_2O_3$ | 0.0 | 0.0 | 6.0 | 0.0 | 0.0 | 0.0 | 1.5 |
| $CeO_2$ | 0.0 | 3.0 | 0.0 | 0.0 | 0.0 | 0.0 | 0.0 |
| $(SiO_2 + Li_2O)/Al_2O_3$ | 11.84 | 11.64 | 10.26 | 12.00 | 11.69 | 10.15 | 11.43 |
| $(SiO_2 + Li_2O)/P_2O_5$ | 46.06 | 45.28 | 50.00 | 46.67 | 46.76 | 45.11 | 53.33 |
| $(Al_2O_3 + Li_2O)/P_2O_5$ | 9.17 | 10.28 | 10.19 | 10.83 | 9.59 | 9.83 | 11.33 |
| $(SiO_2 + Al_2O_3 + Li_2O + ZrO_2)/P_2O_5$ | 51.61 | 50.83 | 56.50 | 52.06 | 52.24 | 50.78 | 59.93 |
| $(MgO + K_2O)/ZrO_2$ | 0.77 | 0.83 | 0.77 | 0.85 | 0.96 | 0.82 | 0.86 |
| $Li_2O/(K_2O + ZrO_2)$ | 2.88 | 3.29 | 3.27 | 2.98 | 3.28 | 2.94 | 2.94 |
| Glass color | Yellow | Yellow | Amaranthine | Purple | Pink | Green | Red |

The invention claimed is:

1. A microcrystalline glass product, wherein the main crystalline phase thereof comprises lithium silicate and quartz, a four-point bending strength of the microcrystalline glass product is above 600 MPa, and the microcrystalline glass product comprises, in percentage by weight, 65-85% of $SiO_2$, 5.83-11.29% of $Al_2O_3$, 5-15% of $Li_2O$, 0.1-6.52% of $ZrO_2$, 0.79-2.5% of $P_2O_5$, 0≤$K_2O$≤6.42%, 0-10% of MgO, 0-10% of ZnO, 0-5% of $Na_2O$, and 0-1% of BaO, wherein $(SiO_2+Al_2O_3+Li_2O+ZrO_2)/P_2O_5$ is 40-90, $(Al_2O_3+Li_2O)/P_2O_5$ is 8.5-20, $Li_2O/(K_2O+ZrO_2)$ is 2.3-4.0, and $(SiO_2+Li_2O)/Al_2O_3$ is 8.85-12.

2. The microcrystalline glass product according to claim 1, further comprising, in percentage by weight, 0-5% of SrO, and/or 0-5% of $TiO_2$, and/or 0-5% $Y_2O_3$, and/or 0-3% of $B_2O_3$, and/or 0-2% of a clarifiant.

3. The microcrystalline glass product according to claim 1, wherein the content of each component satisfies one or more of the following 6 conditions: 1) $(SiO_2+Li_2O)/Al_2O_3$ is 9.1-12, 2) $(Al_2O_3+Li_2O)/P_2O_5$ is 8.5-14, 3) $(SiO_2+Li_2O)/P_2O_5$ is 40-80, 4) $(SiO_2+Al_2O_3+Li_2O+ZrO_2)/P_2O_5$ is 45-85, 5) $(K_2O+MgO)/ZrO_2$ is 0.6-1.2; 6) $Li_2O/(K_2O+ZrO_2)$ is 2.5-3.5.

4. The microcrystalline glass product according to claim 1, comprising, in percentage by weight, 70-80% of $SiO_2$, and/or 5.83-10% of $Al_2O_3$, and/or 7-15% of $Li_2O$, and/or 0.5-6% of $ZrO_2$, 0≤$K_2O$≤5, and/or 0-5% of MgO, and/or 0-5% of ZnO, and/or 0-1% of SrO; and/or 0-1% of $TiO_2$, and/or 0-1% of $Y_2O_3$, and/or 0-3% of $Na_2O$, and/or 0.1-2% of $B_2O_3$, and/or 0-1% of the clarifiant.

5. The microcrystalline glass product according to claim 1, wherein the content of each component satisfies one or more of the following 6 conditions: 1) $(SiO_2+Li_2O)/Al_2O_3$ is 10-12, 2) $(Al_2O_3+Li_2O)/P_2O_5$ is 8.5-14, 3) $(SiO_2+Li_2O)/P_2O_5$ is 40-70, 4) $(SiO_2+Al_2O_3+Li_2O+ZrO_2)/P_2O_5$ is 46-80, 5) $(K_2O+MgO)/ZrO_2$ is 0.7-1.1; 6) $Li_2O/(K_2O+ZrO_2)$ is 2.8-3.3.

6. The microcrystalline glass product according to claim 1, comprising, in percentage by weight, 70-76% of $SiO_2$, and/or 5.83-9.8% of $Al_2O_3$, and/or 8-12.5% of $Li_2O$, and/or 1-5% of $ZrO_2$, and/or 1-2% of $P_2O_5$, 0≤$K_2O$≤3, and/or 0.3-2% of MgO, and/or 0-3% of ZnO, and/or 0-1% of $Na_2O$, and/or 0-1% of $Sb_2O_3$, and/or 0-1% of $SnO_2$, and/or 0-1% of SnO.

7. The microcrystalline glass product according to claim 1, wherein the content of each component satisfies one or more of the following 4 conditions: 1)$(Al_2O_3+Li_2O)/P_2O_5$ is 8.5-14, 2) $(SiO_2+Li_2O)/P_2O_5$ is 42-60, 3)$(SiO_2+Al_2O_3+Li_2O+ZrO_2)/P_2O_5$ is 48-80, or 4) $(K_2O+MgO)/ZrO_2$ is 0.8-1.0.

8. The microcrystalline glass product according to claim 1, comprising, in percentage by weight, 8% to less than 10% of $Li_2O$, and/or not comprising SrO, and/or not comprising BaO, and/or not comprising $TiO_2$, and/or not comprising $Y_2O_3$, and/or not comprising $GeO_2$, and/or not comprising CaO, and/or not comprising $Cs_2O$, and/or not comprising PbO, and/or not comprising $B_2O_3$, and/or not comprising $As_2O_3$, and/or not comprising $La_2O_3$, and/or not comprising $Tb_2O_3$.

9. The microcrystalline glass product according to claim 1, wherein the content of each component satisfies the following condition: 1)$(SiO_2+Li_2O)/P_2O_5$ is 45-60.

10. The microcrystalline glass product according to claim 1, wherein the main crystalline phase thereof further comprises petalite.

11. The microcrystalline glass product according to claim 1, wherein a crystallinity thereof is above 75%.

12. The microcrystalline glass product according to claim 1, wherein a surface stress is above 300 MPa, and/or a depth of an ion exchange layer is above 80 μm, and/or a falling ball test height is above 1,200 mm, and/or a fracture toughness is above 1.5 MPa·m$^{1/2}$, and/or a four-point bending strength is above 700 MPa, and/or the haze for a thickness of below 0.4%, and/or a grain size is below 50 nm, and/or a thermal refractive index coefficient is below −1.1×10$^{−6}$/° C., and/or an average light transmittance for a thickness of 1 mm at a wavelength of 400-800 nm is above 88%, and/or a light transmittance for a thickness of 0.55 mm at a wavelength of 550 nm is above 91%.

13. The microcrystalline glass product according to claim 1, further comprising a colorant, wherein the colorant comprises, in percentage by weight of the microcrystalline glass product, 0-4% of NiO, and/or 0-4% of $Ni_2O_3$, and/or 0-2% of CoO, and/or 0-2% of $Co_2O_3$, and/or 0-7% of $Fe_2O_3$, and/or 0-4% of $MnO_2$, and/or 0-8% of $Er_2O_3$, and/or 0-8% of $Nd_2O_3$, and/or 0-4% of $Cu_2O$, and/or 0-8% of $Pr_2O_3$, and/or 0-4% of $CeO_2$.

14. A microcrystalline glass, wherein the main crystalline phase thereof comprises lithium silicate and quartz, a haze of the microcrystalline glass of a thickness of 0.55 mm is below 0.6%, and the microcrystalline glass comprises, in percentage by weight, 65-85% of $SiO_2$, 5.83-11.29% of $Al_2O_3$, 5-15% of $Li_2O$, 0.1-6.52% of $ZrO_2$, 0.79-2.5% of $P_2O_5$, $0 \le K_2O \le 6.42\%$, 0-10% of MgO, 0-10% of ZnO, and 0-1% of BaO, wherein $(SiO_2+Al_2O_3+Li_2O+ZrO_2)/P_2O_5$ is 40-90, $(Al_2O_3+Li_2O)/P_2O_5$ is 8.5-20, $Li_2O/(K_2O+ZrO_2)$ is 2.3-4.0, and $(SiO_2+Li_2O)/Al_2O_3$ is 8.85-12.

15. The microcrystalline glass according to claim 14, further comprising, in percentage by weight, 0-5% of SrO, and/or 0-5% of $TiO_2$, and/or 0-5% $Y_2O_3$, and/or 0-3% of $B_2O_3$, and/or 0-2% of a clarifiant.

16. The microcrystalline glass according to claim 14, wherein the content of each component satisfies one or more of the following 6 conditions: 1) $(SiO_2+Li_2O)/Al_2O_3$ is 9.1-12, 2) $(Al_2O_3+Li_2O)/P_2O_5$ is 8.5-14; 3) $(SiO_2+Li_2O)/P_2O_5$ is 40-80, 4) $(SiO_2+Al_2O_3+Li_2O+ZrO_2)/P_2O_5$ is 45-85; 5) $(K_2O+MgO)/ZrO_2$ is 0.6-1.2, 6) $Li_2O/(K_2O+ZrO_2)$ is 2.5-3.5.

17. The microcrystalline glass according to claim 14, comprising, in percentage by weight, 70-80% of $SiO_2$, and/or 5.83-10% of $Al_2O_3$, and/or 7-15% of $Li_2O$, and/or 0.5-6% of $ZrO_2$, $0 \le K_2O \le 5$, and/or 0-5% of MgO, and/or 0-5% of ZnO, and/or 0-1% of SrO, and/or 0-1% of $TiO_2$, and/or 0-1% of $Y_2O_3$, and/or 0-3% of $Na_2O$, and/or 0.1-2% of $B_2O_3$, and/or 0-1% of the clarifiant.

18. The microcrystalline glass according to claim 14, wherein the content of each component satisfies one or more of the following 6 conditions: 1) $(SiO_2+Li_2O)/Al_2O_3$ is 10-12, 2)$(Al_2O_3+Li_2O)/P_2O_5$ is 8.5-14, 3) $(SiO_2+Li_2O)/P_2O_5$ is 40-70, 4) $(SiO_2+Al_2O_3+Li_2O+ZrO_2)/P_2O_5$ is 46-80, 5) $(K_2O+MgO)/ZrO_2$ is 0.7-1.1, 6) $Li_2O/(K_2O+ZrO_2)$ is 2.8-3.3.

19. The microcrystalline glass according to claim 14, comprising, in percentage by weight, 70-76% of $SiO_2$, and/or 5.83-9.8% of $Al_2O_3$, and/or 8-12.5% of $Li_2O$, and/or 1-5% of $ZrO_2$, and/or 1-2% of $P_2O_5$, $0 \le K_2O \le 3$, and/or 0.3-2% of MgO, and/or 0-3% of ZnO, and/or 0-1% of $Na_2O$, and/or 0-1% of $Sb_2O_3$, and/or 0-1% of $SnO_2$, and/or 0-1% of SnO.

20. The microcrystalline glass according to claim 14, wherein the content of each component satisfies one or more of the following 4 conditions: 1) $(Al_2O_3+Li_2O)/P_2O_5$ is 8.5-14, 2) $(SiO_2+Li_2O)/P_2O_5$ is 42-60, 3) $(SiO_2+Al_2O_3+Li_2O+ZrO_2)/P_2O_5$ is 48-80, 4) $(K_2O+MgO)/ZrO_2$ is 0.8-1.0.

21. The microcrystalline glass according to claim 14, comprising, in percentage by weight, 9% to less than 10% of $Li_2O$, and/or not comprising SrO; and/or not comprising BaO; and/or not comprising $TiO_2$; and/or not comprising $Y_2O_3$; and/or not comprising $GeO_2$; and/or not comprising CaO; and/or not comprising $Cs_2O$; and/or not comprising PbO; and/or not comprising $As_2O_3$; and/or not comprising $La_2O_3$; and/or not comprising $Tb_2O_3$; and/or not comprising $Na_2O$; and/or not comprising $B_2O_3$.

22. The microcrystalline glass according to claim 14, wherein the content of each component satisfies the following condition: 1) $(SiO_2+Li_2O)/P_2O_5$ is 45-60.

23. The microcrystalline glass according to claim 14, wherein the main crystalline phase further comprises petalite.

24. The microcrystalline glass according to claim 14, wherein a crystallinity thereof is above 75%.

25. The microcrystalline glass according to claim 14, wherein the haze for a thickness of 0.55 mm is below 0.4%, and/or a grain size is below 50 nm, and/or a thermal refractive index coefficient of the microcrystalline glass is below $-1.1 \times 10^{-6}/°$ C., and/or an average light transmittance for a thickness of 1 mm at a wavelength of 400-800 nm is above 88%, and/or a light transmittance for a thickness of 0.55 mm at a wavelength of 550 nm is above 91%.

26. The microcrystalline glass according to claim 14, further comprising a colorant, wherein the colorant comprises, in percentage by weight of the microcrystalline glass, 0-4% of NiO, and/or 0-4% of $Ni_2O_3$, and/or 0-2% of CoO, and/or 0-2% of $Co_2O_3$, and/or 0-7% of $Fe_2O_3$, and/or 0-4% of $MnO_2$, and/or 0-8% of $Er_2O_3$, and/or 0-8% of $Nd_2O_3$, and/or 0-4% of $Cu_2O$, and/or 0-8% of $Pr_2O_3$, and/or 0-4% of $CeO_2$.

27. A glass cover plate, comprising the microcrystalline glass product according to claim 1.

28. A glass cover plate, comprising the microcrystalline glass according to claim 14.

29. An electronic device, comprising the microcrystalline glass product according to claim 1.

30. An electronic device, comprising the microcrystalline glass according to claim 14.

* * * * *